United States Patent
Miyata

(10) Patent No.: US 12,030,581 B2
(45) Date of Patent: Jul. 9, 2024

(54) FLOW PATH CONTROL DEVICE AND VEHICLE HEIGHT ADJUSTMENT DEVICE

(71) Applicant: Showa Corporation, Gyoda (JP)

(72) Inventor: Hiroyuki Miyata, Fukuroi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 947 days.

(21) Appl. No.: 17/031,434

(22) Filed: Sep. 24, 2020

(65) Prior Publication Data

US 2021/0009230 A1   Jan. 14, 2021

Related U.S. Application Data

(63) Continuation of application No. PCT/JP2018/021240, filed on Jun. 1, 2018.

(51) Int. Cl.
| | |
|---|---|
| *F16F 1/12* | (2006.01) |
| *B62K 25/04* | (2006.01) |
| *F16F 9/34* | (2006.01) |
| *F16F 9/46* | (2006.01) |
| *F16F 9/56* | (2006.01) |

(52) U.S. Cl.
CPC .............. *B62K 25/04* (2013.01); *F16F 9/34* (2013.01); *F16F 9/46* (2013.01); *F16F 9/56* (2013.01); *B62K 2025/045* (2013.01)

(58) Field of Classification Search
CPC .......... B62K 2025/045; B62K 25/2025; B62K 25/045; F16F 9/34; F16F 9/46; F16F 9/56
USPC ........ 188/266, 266.2–266.5, 322.13, 322.15, 188/322.22; 137/14, 454.5; 251/129.05, 251/129.08
See application file for complete search history.

(56) References Cited

U.S. PATENT DOCUMENTS

| | | | |
|---|---|---|---|
| 5,078,239 A | 1/1992 | Kobayashi et al. | |
| 10,286,975 B2 * | 5/2019 | Miyata ................... | B62K 25/08 |

(Continued)

FOREIGN PATENT DOCUMENTS

| | | |
|---|---|---|
| CN | 101550981 A | 10/2009 |
| CN | 106030147 A | 10/2016 |

(Continued)

OTHER PUBLICATIONS

International Search Report dated Jul. 17, 2018 for the corresponding PCT International Patent Application No. PCT/JP2018/021240.

(Continued)

*Primary Examiner* — Christopher P Schwartz
(74) *Attorney, Agent, or Firm* — Leason Ellis LLP; Edward J. Ellis; Melvin C. Garner

(57) ABSTRACT

A flow path control device includes: an on-off valve for opening or closing a flow path through which fluid flows from a first chamber to a second chamber; a control valve which controls the opening and closing of the on-off valve by transiting between a first state and a second state; and a push rod which includes a rod-shaped portion of which one end is pressed and moved to the other side and the other end causes the control valve to transition from the first state to the second state and a protruding portion which protrudes radially outward of the rod-shaped portion from an outer peripheral surface of the rod-shaped portion so as to receive pressure of fluid flowing from the first chamber to the second chamber.

20 Claims, 22 Drawing Sheets

(56) References Cited

U.S. PATENT DOCUMENTS

| | | | |
|---|---|---|---|
| 10,315,722 B2* | 6/2019 | Murakami | B60G 17/048 |
| 2009/0242339 A1 | 10/2009 | Nakadate et al. | |
| 2014/0182696 A1* | 7/2014 | Wimmer | F16F 9/465 |
| | | | 138/31 |
| 2017/0016506 A1 | 1/2017 | Senou et al. | |
| 2017/0282995 A1 | 10/2017 | Murakami et al. | |
| 2021/0009230 A1 | 1/2021 | Miyata | |
| 2021/0207679 A1* | 7/2021 | Yamashita | F16F 9/19 |

FOREIGN PATENT DOCUMENTS

| | | | |
|---|---|---|---|
| CN | 111971486 A | 11/2020 | |
| EP | 1886912 A | 2/2008 | |
| JP | 02-021043 A | 1/1990 | |
| JP | 08-022680 B2 | 3/1996 | |
| JP | 2006-292138 A | 10/2006 | |
| JP | 2012-021567 A | 2/2012 | |
| JP | 5543864 B2 | 7/2014 | |
| JP | 2017-178176 A | 10/2017 | |

OTHER PUBLICATIONS

Chinese Office Action dated Aug. 4, 2021 for the corresponding Chinese Patent Application No. 201880091821.7.

\* cited by examiner

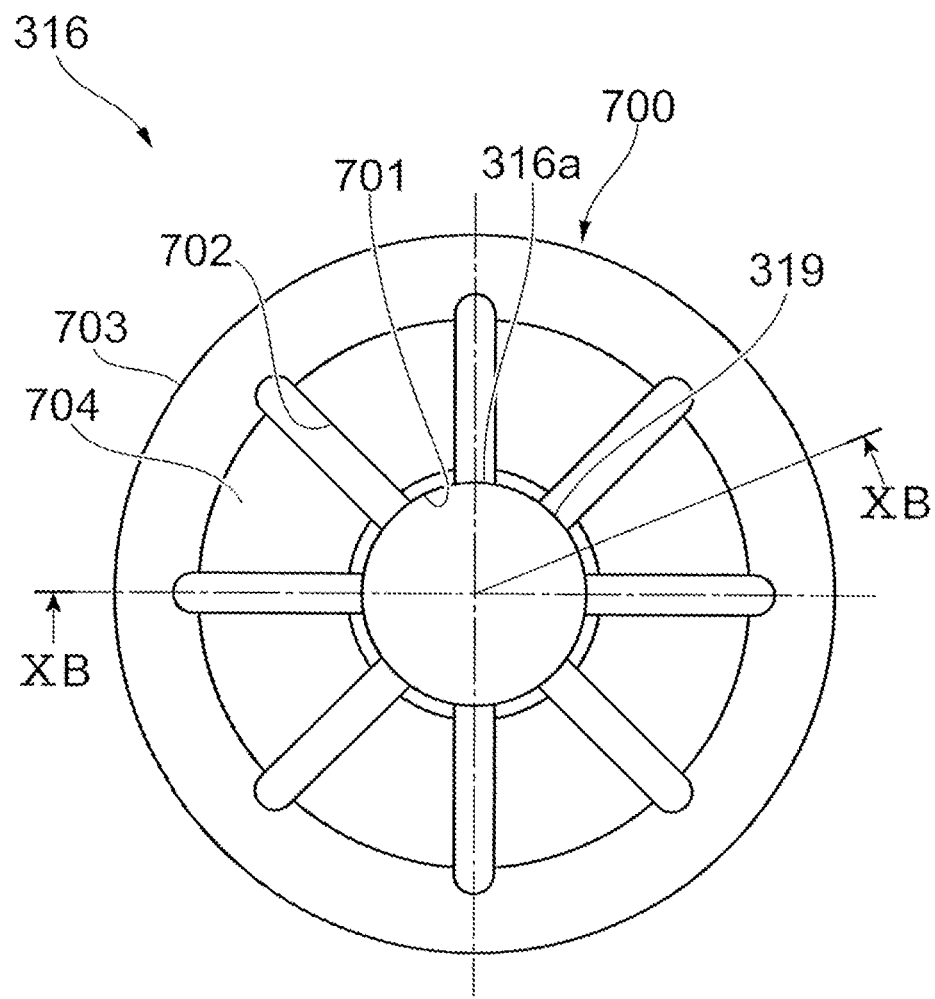

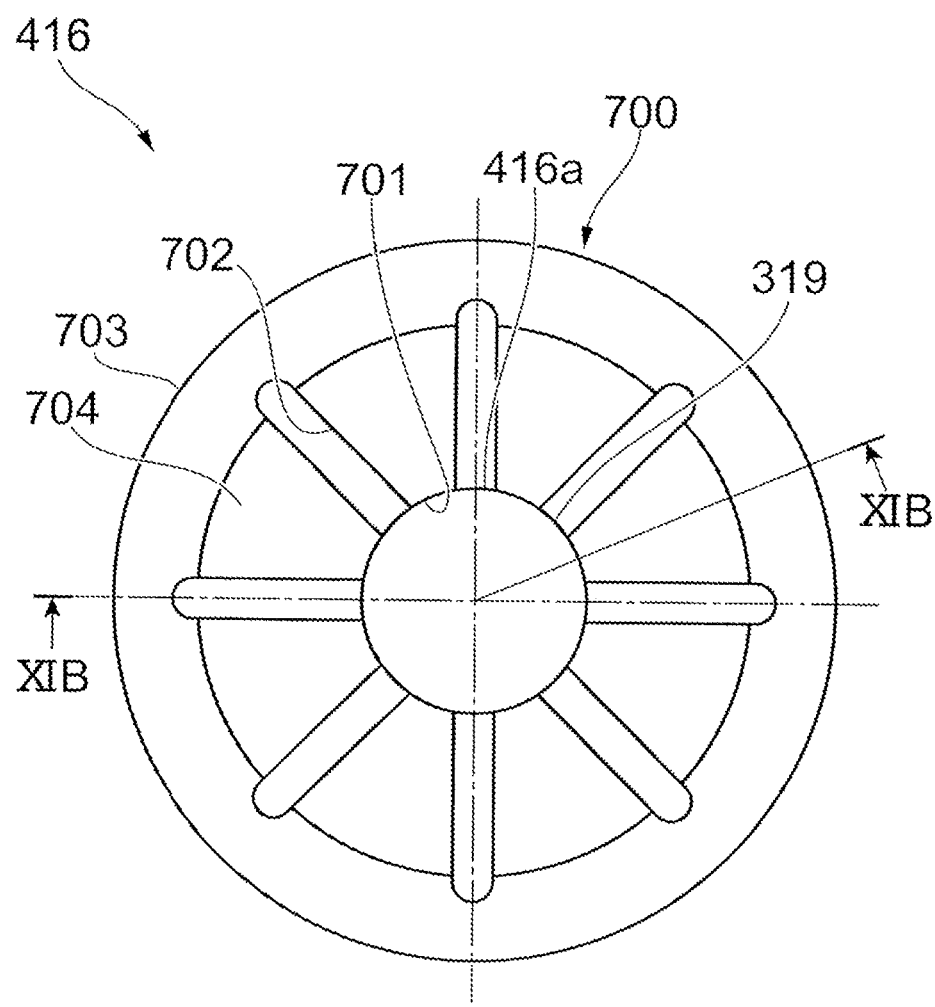

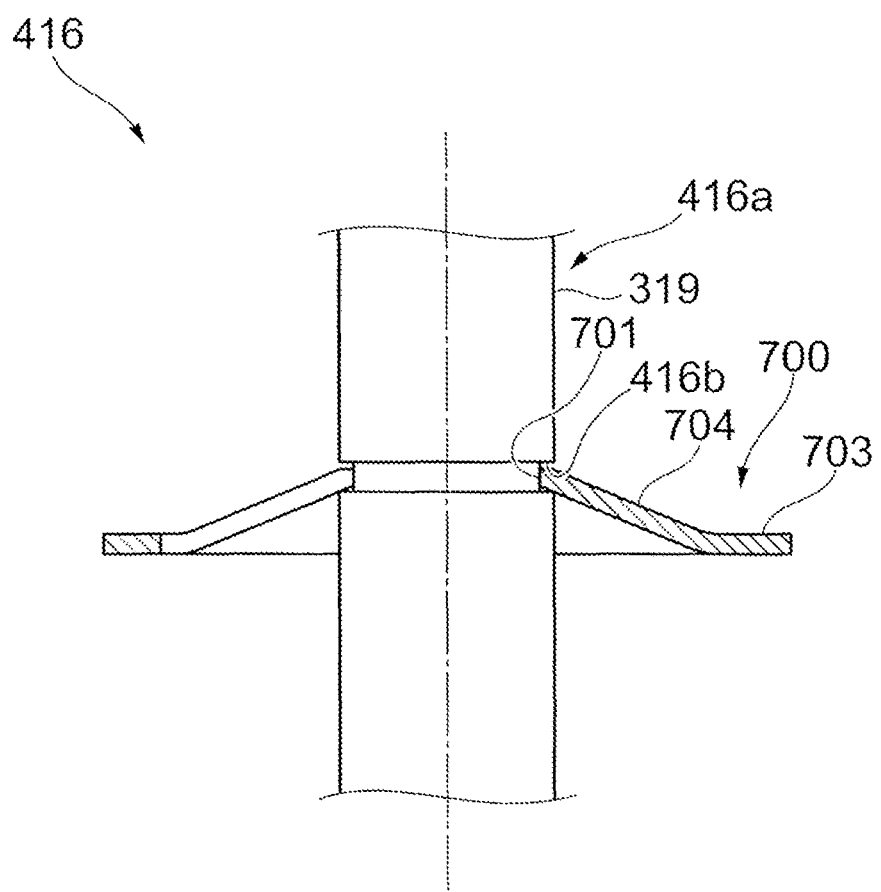

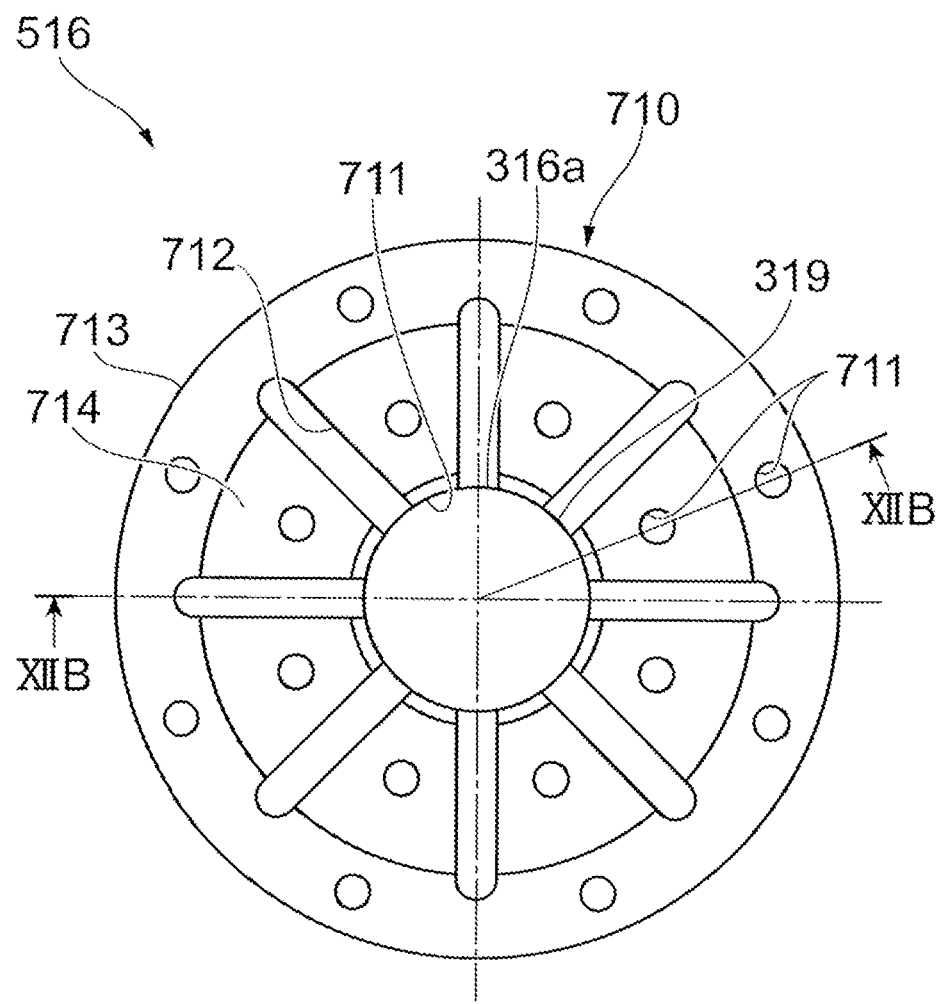

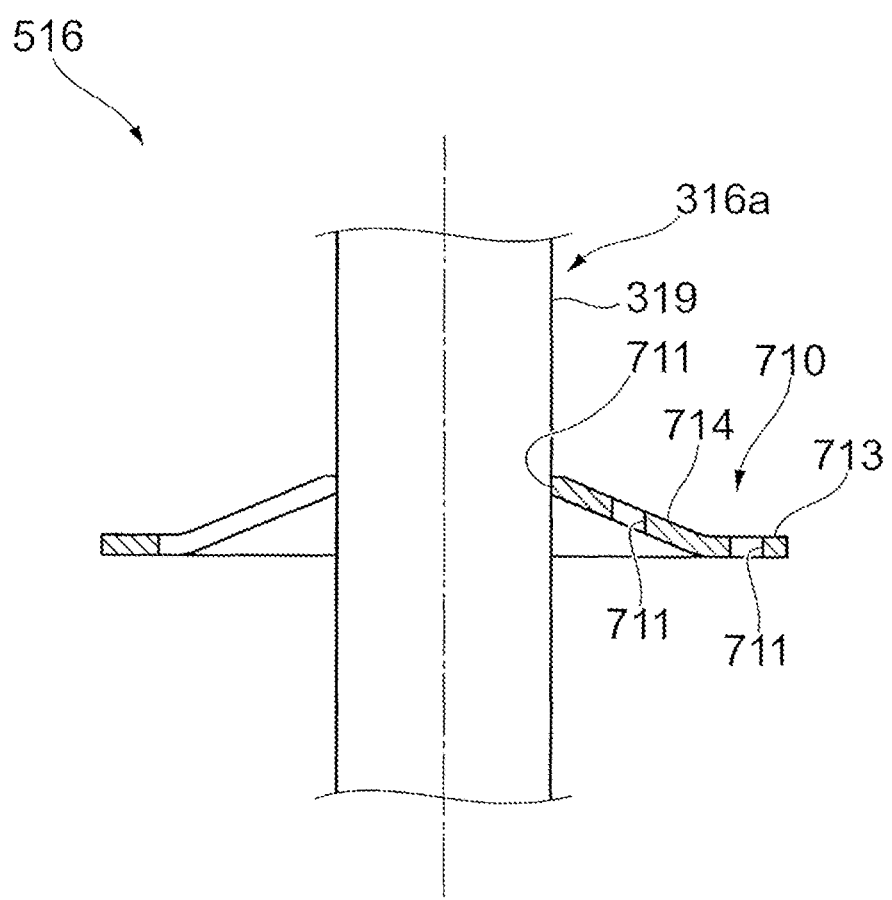

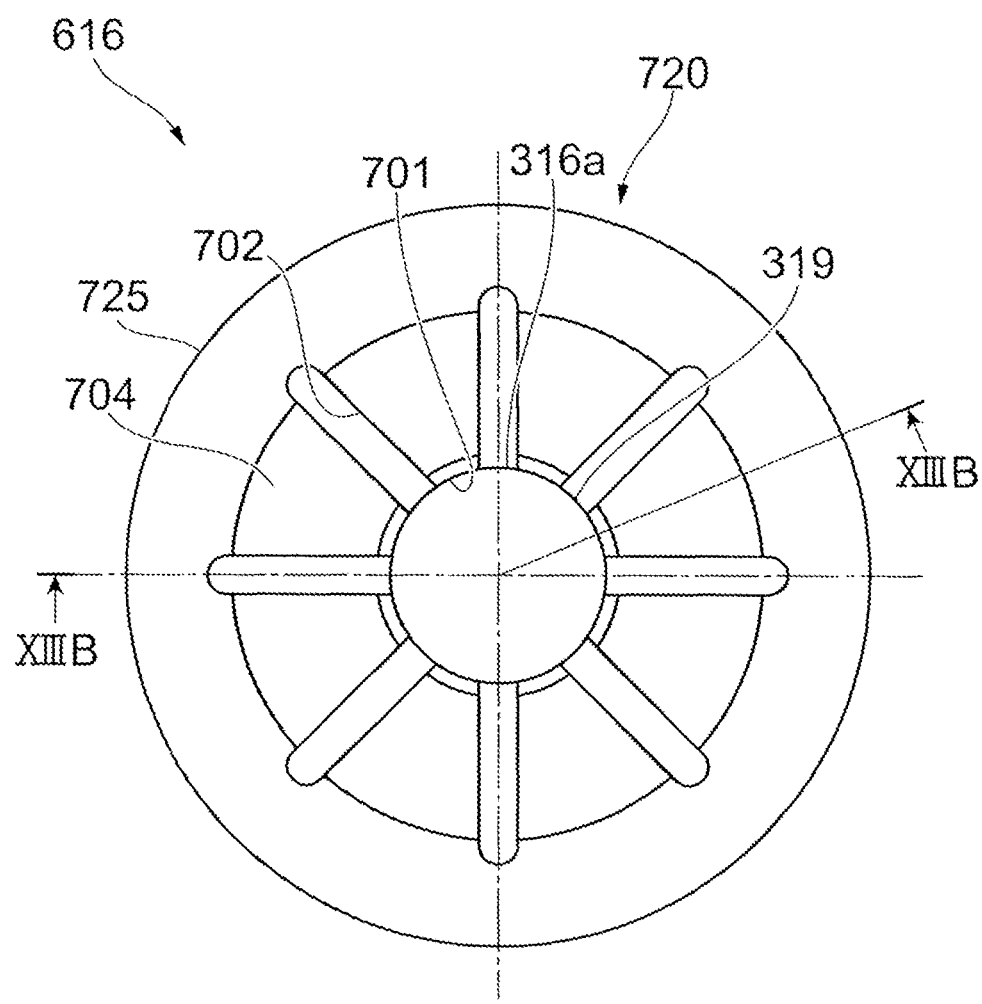

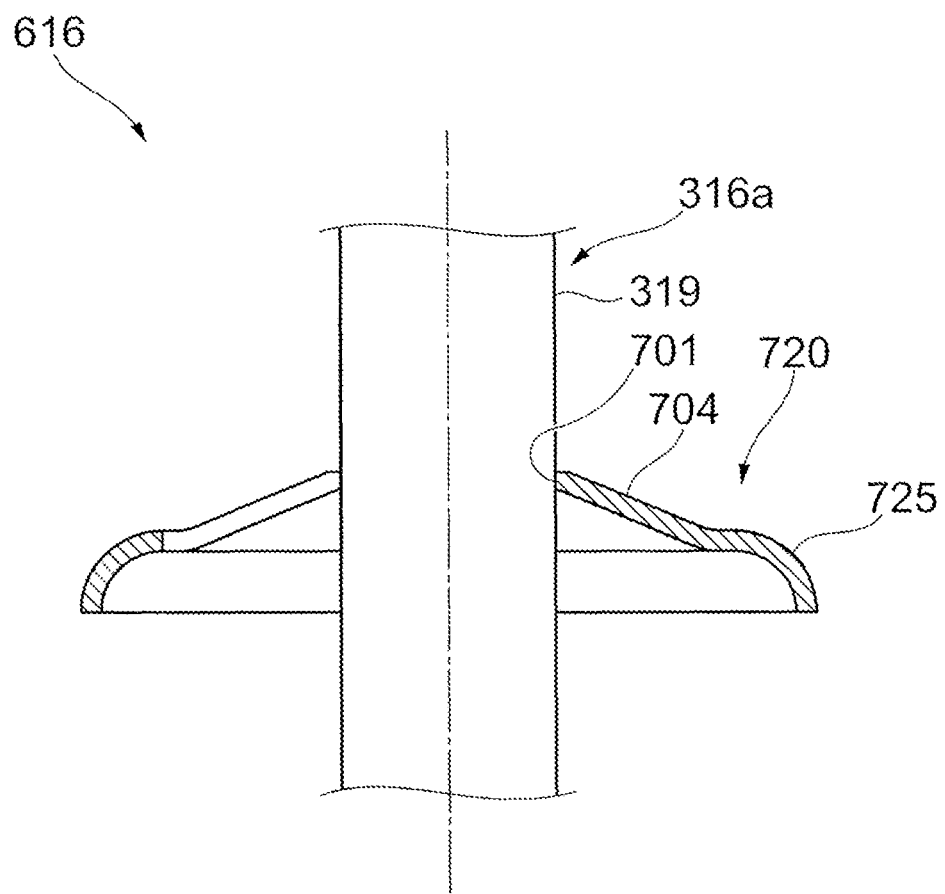

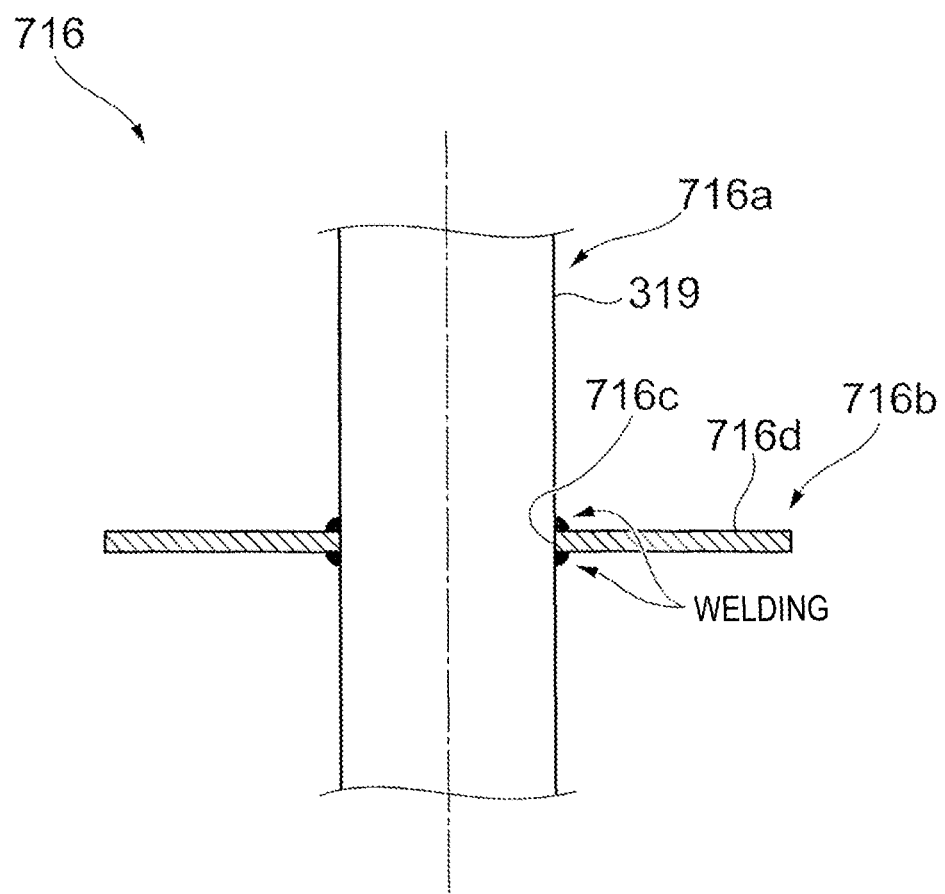

FLOW PATH CONTROL DEVICE AND VEHICLE HEIGHT ADJUSTMENT DEVICE

CROSS-REFERENCE TO RELATED APPLICATION(S)

This application is a continuation of PCT application No. PCT/JP2018/021240, which was filed on Jun. 1, 2018, the content of which is incorporated herein by reference in its entirety.

TECHNICAL OF THE INVENTION

The present invention relates to a flow path control device and a vehicle height adjustment device.

BACKGROUND OF THE INVENTION

For example, Patent Literature 1 discloses a vehicle height adjustment device which automatically changes the vehicle height in response to the vehicle speed of a motorcycle so as to automatically increase the vehicle height when the vehicle speed reaches a set speed and automatically lower the vehicle height when the vehicle speed falls below the set speed. More specifically, a technique of controlling the vehicle height by using an adjustment valve body which shuts off communication between a primary oil chamber and a secondary oil chamber with respect to a flow path for flowing hydraulic oil such as a flow path for supplying hydraulic oil to the hydraulic oil chamber and a flow path for discharging hydraulic oil from the hydraulic oil chamber is disclosed.
Patent Literature 1: JP-H08-22680B When controlling a flow path of fluid such as oil (hydraulic oil) using an on-off valve which opens or closes the flow path, it is desirable that the on-off valve be quickly opened or closed in order to quickly control the flow path.

An object of the invention is to provide a flow path control device and the like which can quickly open or close an on-off valve.

SUMMARY OF THE INVENTION

Hereinafter, the invention will be described. In the following description, reference numerals and letters in the accompanying drawings are added in parentheses to facilitate understanding of the invention. However, the invention is not limited to the illustrated forms.

An aspect of the invention is a flow path control device (300) which includes an on-off valve (304) for opening or closing a flow path (R4) through which fluid flows from a first chamber (60) to a second chamber (40), a control valve (303) which controls the opening and closing of the on-off valve (304) by transiting between a first state in which the on-off valve (304) is moved to a position where the flow path (R4) is closed and a second state in which the on-off valve (304) is moved to a position where the flow path (R4) is opened, and a push rod (316, 416, 516, 616, 716, 816) which includes a rod-shaped portion (316a, 416a, 716a) of which one end is pressed and moved to the other side and the other end causes the control valve (303) to transition from the first state to the second state and a protruding portion (700, 710, 720, 716b) which protrudes radially outward of the rod-shaped portion (316a, 416a, 716a) from an outer peripheral surface of the rod-shaped portion (316a, 416a, 716a) so as to receive pressure of fluid flowing from the first chamber (60) to the second chamber (40).

Here, a space between the outer peripheral surface of the rod-shaped portion (316a) and an inner peripheral surface of a member (330, 395) surrounding an outer periphery of the rod-shaped portion (316a) may be a part of the flow path (R4) and the protruding portion (700) may be disposed in the space.

A detour (R3) in which fluid bypasses a position which is closed by the on-off valve (304) and flows from the first chamber (60) to the second chamber (40) when the on-off valve (304) closes the flow path (R4) may be provided inside the on-off valve (304) and the push rod (816) may have an inner protruding portion (730) which protrudes radially outward of the rod-shaped portion (316a) from the outer peripheral surface of the rod-shaped portion (316a) inside the on-off valve (304).

Further, a washer (700) fitted on the outer peripheral surface of the rod-shaped portion (316a) may be the protruding portion (700).

The washer (700) may have a through-hole (701) in which the rod-shaped portion (316a) is fitted in a central portion and an inclined portion (704) which is continuous with the through-hole (701) and is inclined with respect to an axial direction of the rod-shaped portion (316a) and an inner diameter of the inclined portion (704) may be reduced as it goes away from the control valve (303).

The rod-shaped portion (416a) may have a groove (416b) recessed from the outer peripheral surface and the washer (700) may be fitted to the outer peripheral surface of the rod-shaped portion (416a) at the groove (416b).

The protruding portion (716b) may be joined to the rod-shaped portion (716a).

In addition, the protruding portion (710) may have a plurality of holes (711) penetrating in the axial direction of the rod-shaped portion (316a).

Further, the invention is a vehicle height adjustment device (21) which includes a spring (500) with one end supported on a vehicle body (10) side and the other end supported on a wheel (2) side, a changing device (250) which changes a length of the spring (500) according to an amount of fluid in the first chamber (60) for accommodating fluid, and the flow path control device (300) having the above characteristic points.

Advantageous Effects of Invention

According to an aspect of the invention, the flow path control device and the like which can open or close an on-off valve quickly can be provided.

BRIEF DESCRIPTION OF THE DRAWINGS

FIG. 10A is a diagram illustrating a schematic configuration of a push rod 316.

FIG. 11A is a diagram illustrating a schematic configuration of a push rod 416.

FIG. 11B is a cross-sectional view of a portion XIB in FIG. 11A.

FIG. 12A is a diagram illustrating a schematic configuration of a push rod 516.

FIG. 12B is a cross-sectional view of a portion XIIB in FIG. 12A.

FIG. 13A is a diagram illustrating a schematic configuration of a push rod 616.

FIG. 13B is a cross-sectional view of a portion XIIIB in FIG. 13A.

FIG. 14B is a diagram illustrating a schematic configuration of the push rod 716.

DETAILED DESCRIPTION OF THE INVENTION

Hereinafter, embodiments of the invention will be described in detail with reference to the accompanying drawings.

Figure 1:
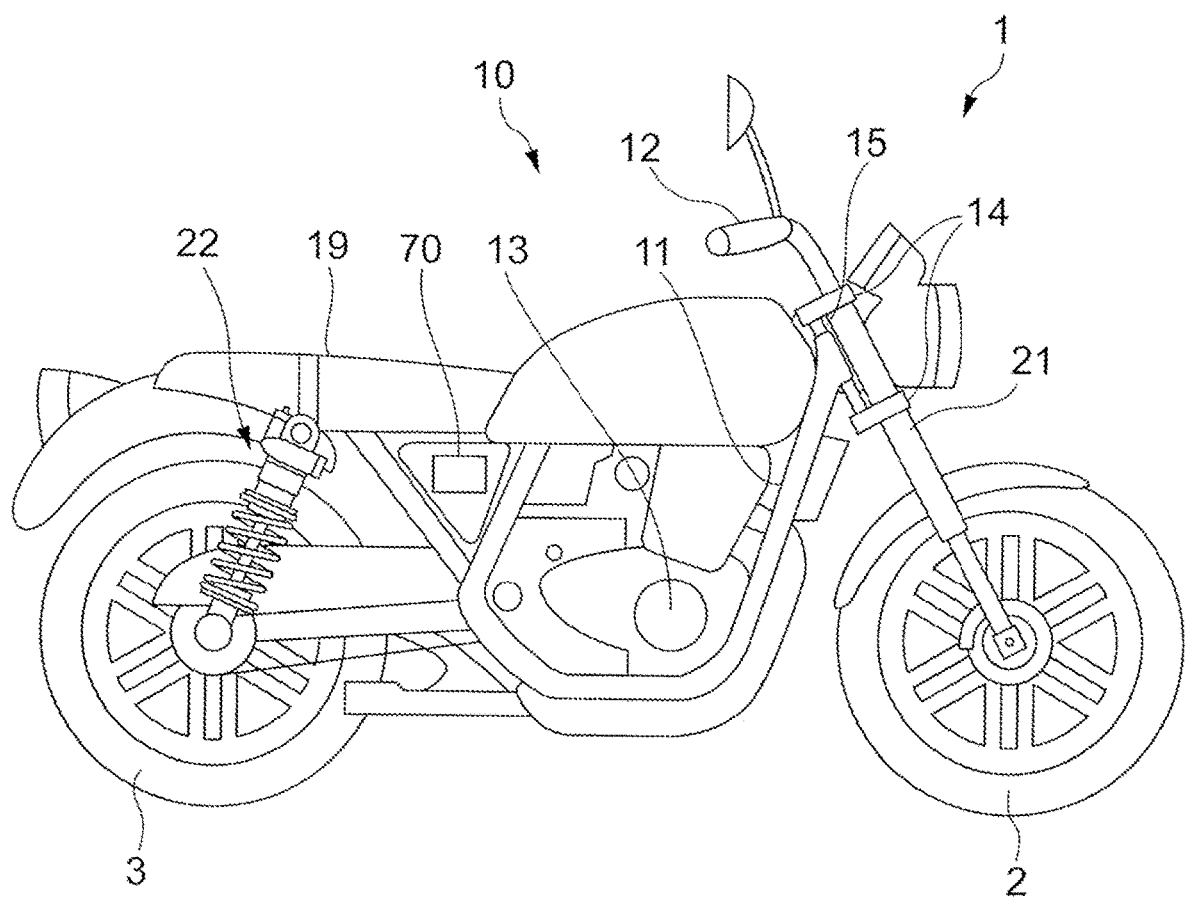
FIG. 1 is a diagram illustrating a schematic configuration of a motorcycle 1.

FIG. 1 is a diagram illustrating a schematic configuration of a motorcycle 1 according to the embodiment.

The motorcycle 1 includes a front wheel 2, a rear wheel 3, and a vehicle body 10 having a body frame 11 which forms a skeleton of the motorcycle 1, a handle 12, an engine 13, a seat 19, and the like.

Further, the motorcycle 1 includes a front fork 21 for connecting the front wheel 2 and the vehicle body 10 and a rear suspension 22 for connecting the rear wheel 3 and the vehicle body 10.

In addition, the motorcycle 1 includes two brackets 14 for holding a pair of front forks 21 and 21 arranged so as to pinch the front wheel 2 and a shaft 15 disposed between the two brackets 14 and rotatably supported by the body frame 11.

Further, the motorcycle 1 includes a control device 70 which controls a vehicle height of the motorcycle 1 by controlling a flow path switching unit 300 described below.

Configuration of Front Fork 21

Figure 2:
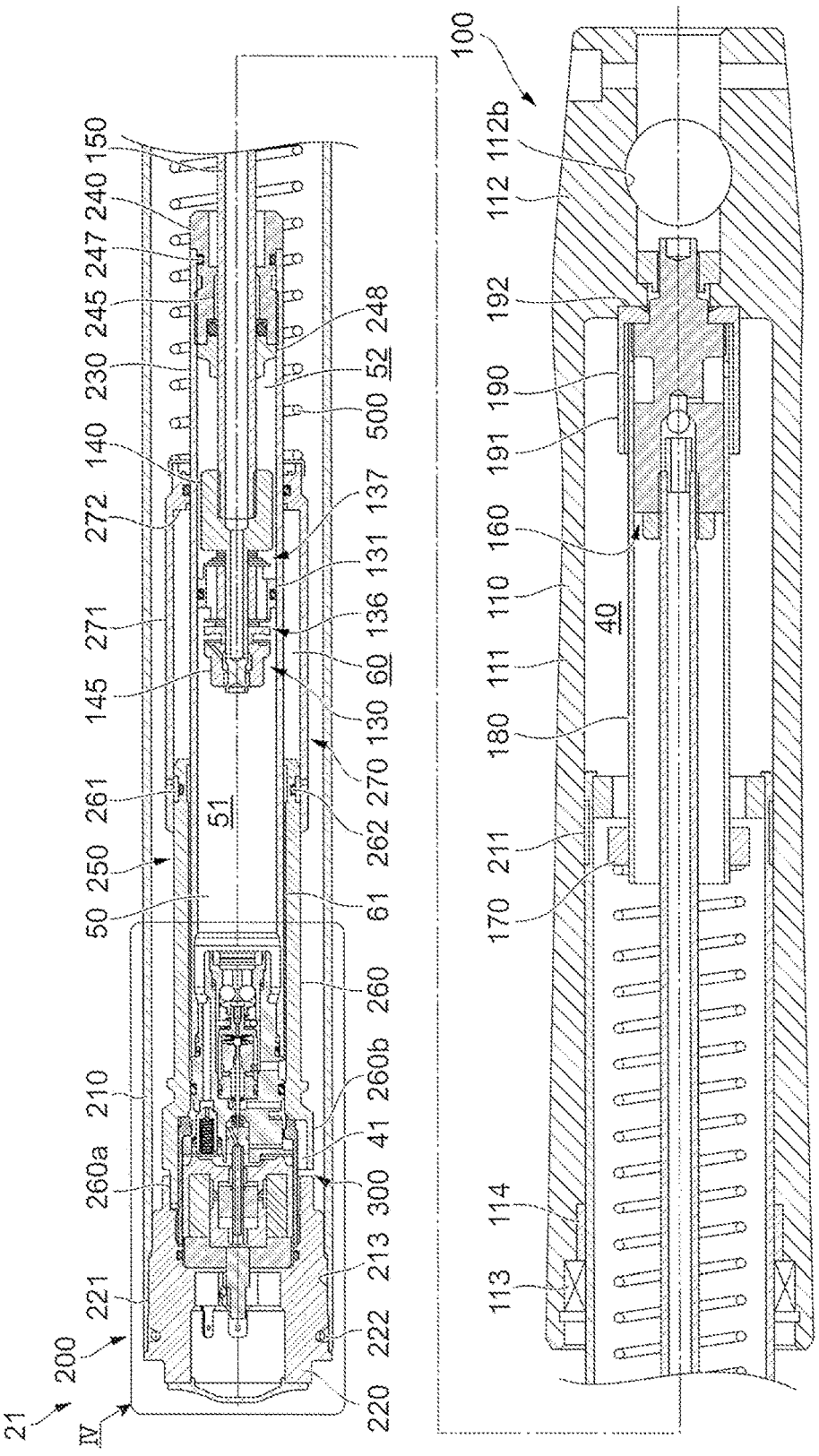
FIG. 2 is a cross-sectional view of a front fork 21.

FIG. 2 is a cross-sectional view of the front fork 21 according to the embodiment of the invention.

The front fork 21 includes an axle-side unit 100 having an outer member 110 and attached to an axle of the front wheel 2 and a body-side unit 200 having an inner tube 210 and attached to the vehicle body 10. Further, the front fork 21 includes a spring 500 which is disposed between the axle-side unit 100 and the body-side unit 200 and absorbs vibrations that the front wheel 2 receives due to unevenness of the road surface.

The outer member 110 and the inner tube 210 are cylindrical members arranged coaxially and a direction (axial direction) of a center line of the cylinder may be hereinafter referred to as "up-down direction". In such a case, the vehicle body 10 side is the "upper" side and the front wheel 2 side is the "lower" side. The front fork 21 suppresses vibration by absorbing the unevenness of the road surface while supporting the front wheel 2 by moving the axle-side unit 100 and the body-side unit 200 relatively in the up-down direction (axial direction). In the following, the "cross-sectional area" means an area when cut along a plane whose normal direction is the axial direction, unless otherwise specified.

Configuration of Axle-Side Unit 100

The axle-side unit 100 includes an outer member 110 attached to the axle of the front wheel 2, a damping force generating unit 130 which generates a damping force using viscous resistance of oil, a rod 150 for holding the damping force generating unit 130, and a rod holding member 160 for holding a lower end of the rod 150.

Also, the axle-side unit 100 includes a spring support member 170 for supporting a lower end of the spring 500, a support member holding member 180 for holding the spring support member 170, and a guide member 190 for guiding the axial movement of the inner tube 210.

The outer member 110 has a cylindrical portion 111 into which the inner tube 210 is inserted and an axle bracket portion 112 to which the axle of the front wheel 2 can be attached.

The cylindrical portion 111 has an oil seal 113 and a slide bush 114 at the upper end.

The axle bracket portion 112 has an axle mounting hole 112b formed therein.

The damping force generating unit 130 includes a piston 131 which partitions the inside of a hydraulic oil chamber 50 formed in a space inside a cylinder 230, a valve 136 provided on the upper end side of the piston 131, and a valve 137 provided on the lower end side of piston 131. In addition, the damping force generating unit 130 includes a piston bolt 140 which supports the piston 131, the valve 136, the valve 137, and the like and a nut 145 which is fastened to the piston bolt 140 to define the positions of the piston 131, the valve 136, the valve 137, and the like.

The damping force generating unit 130 is held on the rod 150 by fastening a male screw formed on the upper end of the rod 150 to a female screw formed on the piston bolt 140. Then, the piston 131 partitions the space inside the cylinder 230 into a first oil chamber 51 above the piston 131 and a second oil chamber 52 below the piston.

The rod 150 is a cylindrical member and a male screw is formed on the outer peripheral surfaces at the upper end and the lower end. The male screw formed at the lower end is fastened to a female screw formed at an upper-end-side cylindrical portion of the rod holding member 160.

The rod holding member 160 is a member having a plurality of cylindrical portions having different diameters.

The spring support member 170 is a cylindrical member and is fixed to the upper end of the support member holding member 180. Examples of the fixing method include welding, press fitting, and fixing using a stopper ring.

The support member holding member 180 is a cylindrical member and has a lower end formed with a female screw to which a male screw formed on the rod holding member 160 is tightened. The support member holding member 180 has a communication hole communicating between the inside and the outside at a position corresponding to a radial recess portion of the rod holding member 160 at an axial position.

The guide member 190 has a cylindrical portion 191 having a cylindrical shape, and an inward portion 192 formed to extend radially inward from the lower end of the cylindrical portion 191.

A sealing member such as an O-ring is fitted into a space formed between the lower end of an inward portion 192 and the rod holding member 160.

In the axle-side unit 100 configured as described above, a reservoir chamber 40 for storing oil sealed in the front fork 21 is formed between the inner peripheral surface of the outer member 110 and the outer peripheral surfaces of the rod 150 and the support member holding member 180.

Configuration of Body-Side Unit 200

The body-side unit 200 includes a cylindrical inner tube 210 having both ends opened and a cap 220 attached to an upper end of the inner tube 210.

In addition, the body-side unit 200 includes a cylindrical cylinder 230 and a sealing member 240 attached to a lower end of the cylinder 230 to seal a space inside the cylinder 230.

Also, the body-side unit 200 includes a spring length changing unit 250 which supports the upper end of the spring 500 and adjusts (changes) the length of the spring 500 and the flow path switching unit 300 attached to the upper end of the cylinder 230 to switch the flow path of oil as an example of a fluid.

Configuration of Inner Tube 210

The inner tube 210 is a cylindrical member.

The inner tube 210 has a slide bush 211 at the lower end and a female screw 213 at the upper end.

Configuration of Cap 220

The cap 220 is a substantially cylindrical member. On the outer peripheral surface, a male screw 221 to be tightened to the female screw 213 is formed, and on the inner peripheral surface, a female screw to be tightened by male screws formed in the spring length changing unit 250 and the flow path switching unit 300 is formed. The cap 220 is attached to the inner tube 210 and holds the spring length changing unit 250 and the flow path switching unit 300.

The cap 220 has a sealing member 222 such as an O-ring.

Configuration of Cylinder 230

The cylinder 230 is a cylindrical member. On the outer peripheral surface of the upper end, a female screw is formed to which a male screw formed in the flow path switching unit 300 is tightened. On the inner peripheral surface of the lower end, a female screw is formed to which a male screw formed on the sealing member 240 is tightened.

Configuration of Sealing Member 240

The sealing member 240 is a cylindrical member. On the outer peripheral surface, a male screw is formed which is fastened to a female screw formed on the inner peripheral surface at the lower end of the cylinder 230. The sealing member 240 is held by the cylinder 230.

The sealing member 240 has a slide bush 245 on the inner peripheral side and a sealing member 247 such as an O-ring on the outer peripheral side. At an upper end portion of the sealing member 240, an impact reducing member 248 for reducing an impact at the time of coming in contact with the damping force generating unit 130 is attached.

Configuration of Spring Length Changing Unit 250

The spring length changing unit 250 includes a base member 260 fixed to the cap 220 and an upper end support member 270 which supports the upper end of the spring 500 and changes the length of the spring 500 by moving relative to the base member 260 in the axial direction.

The base member 260 is a substantially cylindrical member. An axial protrusion portion 260a is provided at the upper end of the base member 260 and the axial protrusion portion 260a is fixed to the cap 220. In addition, the base member 260 has, at the upper end thereof, a radial protrusion portion 260b of which a part in a circumferential direction protrudes in the radial direction. A discharge flow path 41 for discharging the oil in the cylinder 230 to the reservoir chamber 40 is formed between the inside of the radial protrusion portion 260b and the outer peripheral surface at the lower end of a support member 400 described below.

The base member 260 has a slide bush 261 and a sealing member 262 such as an O-ring at the lower end. An annular flow path 61 is formed between the inner peripheral surface of the base member 260 and the outer peripheral surface of the cylinder 230.

The upper end support member 270 has a cylindrical portion 271 and an inward portion 272 formed so as to extend inward in the radial direction from the lower end of cylindrical portion 271. The upper end support member 270 forms a jack chamber 60 for accommodating oil for changing the position of the upper end support member 270 with respect to the base member 260 in a space between the outer peripheral surface of the cylinder 230 and the lower end of the base member 260.

The cylindrical portion 271 is formed with a hole penetrating in the radial direction so as to communicate inside and outside of the cylindrical portion 271. The oil is discharged from the jack chamber 60 to the reservoir chamber 40 through the holes, so that the amount of movement of the upper end support member 270 with respect to the base member 260 is limited.

The inward portion 272 has a sealing member such as an O-ring on the inner peripheral side.

The oil in the cylinder 230 is supplied to the jack chamber 60 via the annular flow path 61 formed between the inner peripheral surface of the base member 260 and the outer peripheral surface of the cylinder 230.

Configuration of Flow Path Switching Unit 300

Figure 3:
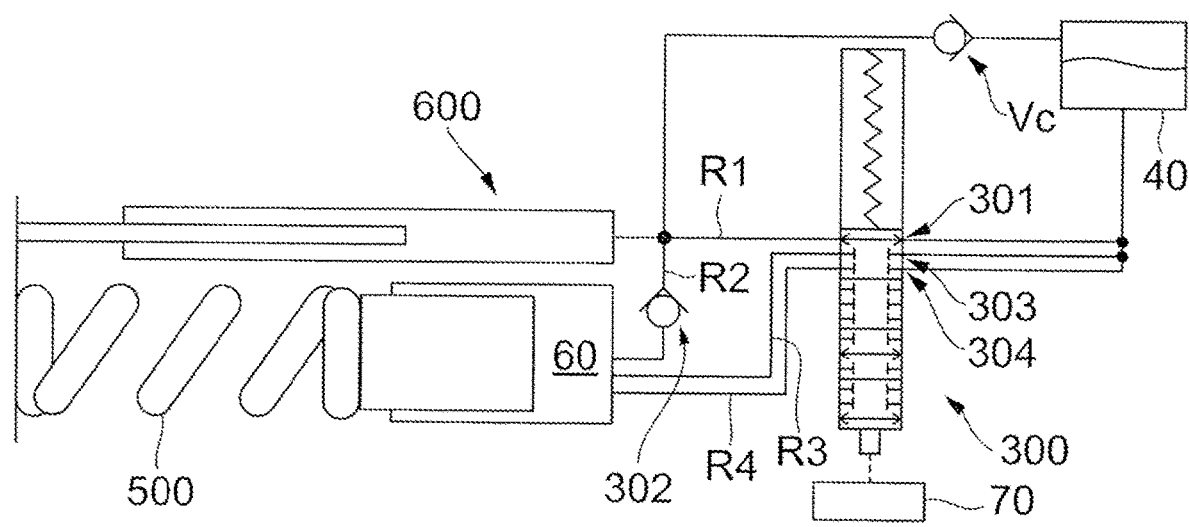
FIG. 3 is a view schematically illustrating a flow path of a flow path switching unit 300.

FIG. 3 is a diagram schematically showing illustrating the flow path of the flow path switching unit 300.

The flow path switching unit 300 is a device which switches between supplying the oil discharged from a pump 600 described below, the pump 600 including a damping force generating unit 130, a rod 150, a cylinder 230, and the like, to the reservoir chamber 40 or the jack chamber 60 and supplying the oil contained in the jack chamber 60 to the reservoir chamber 40.

In the flow path switching unit 300, a first communication path R1 which communicates the inside of the cylinder 230 with the reservoir chamber 40, a second communication path R2 which communicates the inside of the cylinder 230 with the jack chamber 60, and a third communication path R3 and a fourth communication path R4 which communicate the jack chamber 60 with the reservoir chamber 40 are formed.

The flow path switching unit 300 has a first on-off valve 301 for opening or closing the first communication path R1, a second on-off valve 302 for opening or closing the second communication path R2, a third on-off valve 303 for opening or closing the third communication path R3, and a fourth on-off valve 304 for opening or closing the fourth communication path R4.

Specific Configuration of Flow Path Switching Unit 300

Figure 4:
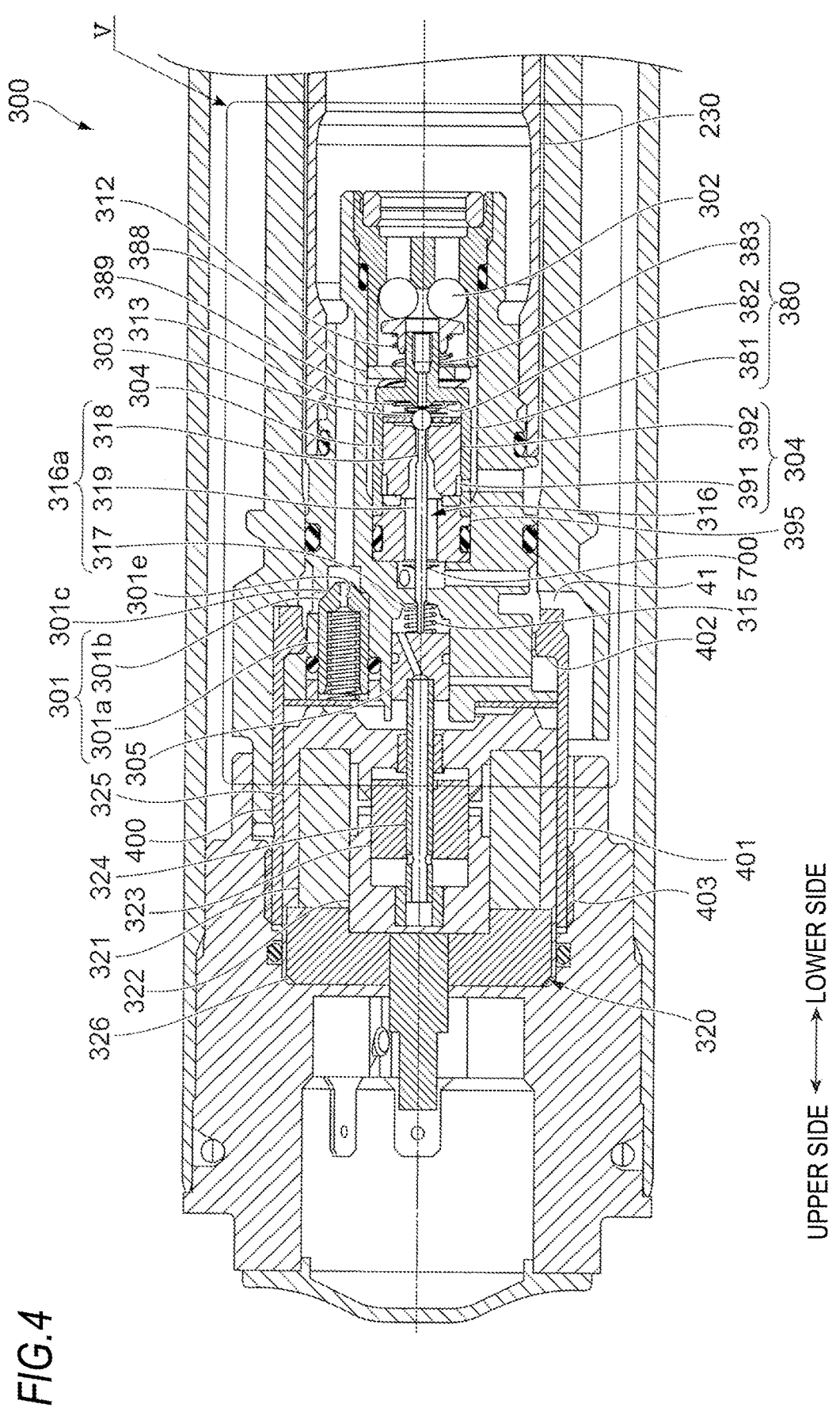
FIG. 4 is an enlarged view of a portion IV in FIG. 2.
Figure 5:
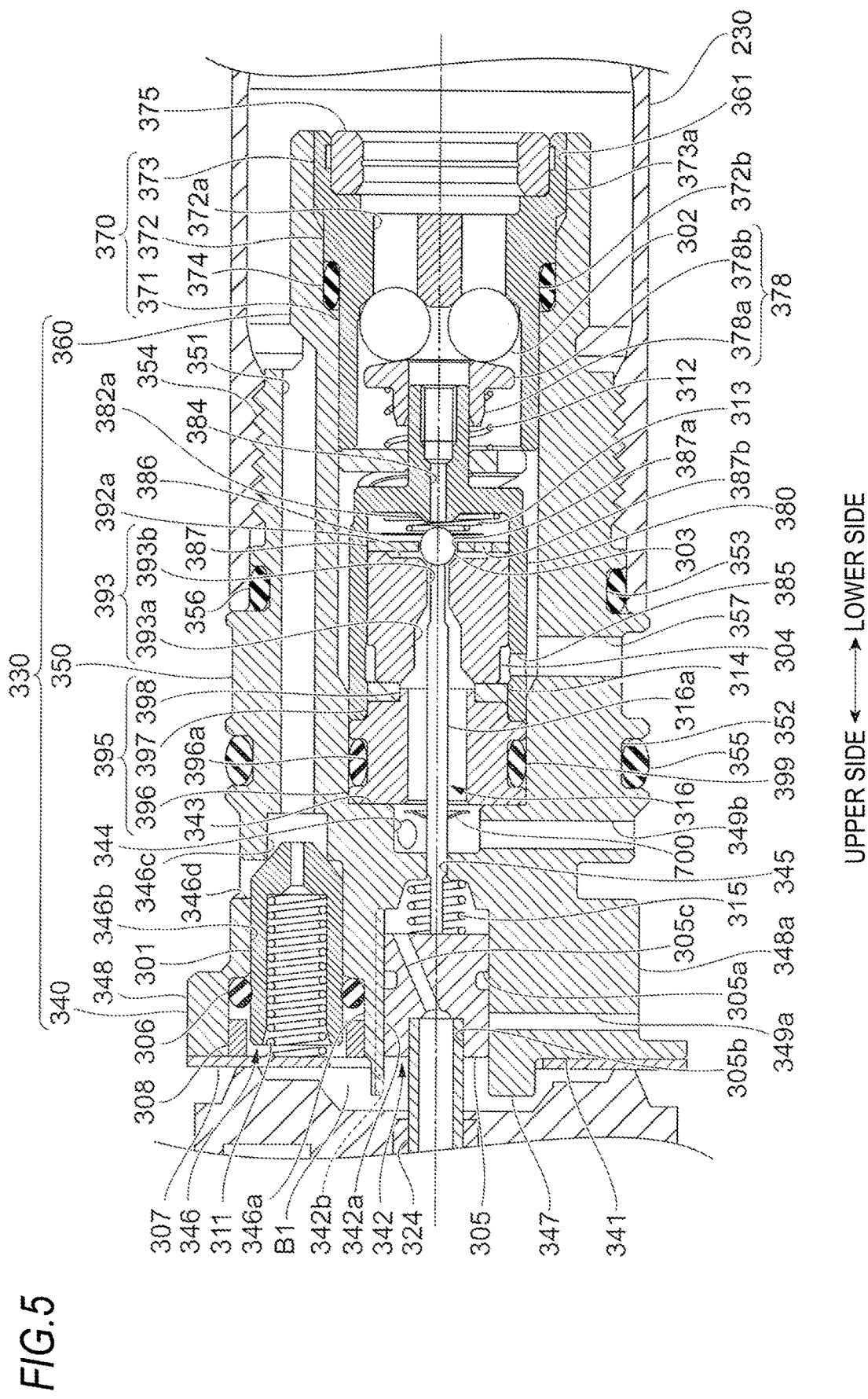
FIG. 5 is an enlarged view of a portion V in FIG. 4.

FIG. 4 is an enlarged view of a portion IV in FIG. 2 and FIG. 5 is an enlarged view of a portion V in FIG. 4. The flow path switching unit 300 will be described with reference to FIGS. 4 and 5.

The flow path switching unit 300 includes a first coil spring 311 for applying a force to the first on-off valve 301 in a direction to close the first communication path R1, a second coil spring 312 for applying a force to the second on-off valve 302 in a direction to close the second communication path R2, and a third coil spring 313 for applying a force to the third on-off valve 303 in a direction to close the third communication path R3.

Also, the flow path switching unit 300 includes a control valve 305 for controlling the opening and closing of the first on-off valve 301, a coil spring 315 provided below the control valve 305, and a solenoid 320 which moves the control valve 305 downward against the spring force of the coil spring 315.

The flow path switching unit 300 includes a push rod 316 which moves the third on-off valve 303 downward against the spring force of the third coil spring 313. The push rod 316 moves downward by being pushed by the control valve 305.

The flow path switching unit 300 includes a unit body 330 and a support member 370 mounted on the unit body 330 and supporting the second on-off valve 302. The flow path switching unit 300 includes a support member 380 which supports the fourth on-off valve 304 and a member 395 which is attached to the opening of the support member 380. The flow path switching unit 300 includes a support member 388 and a leaf spring 389 which are disposed between the support member 370 and the inward portion 382 of the support member 380 and support the upper end of the second coil spring 312.

First On-Off Valve 301

The first on-off valve 301 has a cylindrical portion 301a and a conical portion 301b having an inclined surface 301c which is inclined with respect to the axial direction so that the outer diameter decreases as going downward.

A sealing member 306 such as an O-ring is fitted between the outer peripheral surface of the cylindrical portion 301a and an upper end 340 of the unit body 330.

At the center of the conical portion 301b, there is formed an axial through-hole 301e communicating the inside of the cylindrical portion 301a and the outside of the conical portion 301b. The through-hole 301e communicates an axial communication hole 351 of the unit body 330 with a space (hereinafter, referred to as "back pressure chamber B1".) in which oil that applies a downward force to the first on-off valve 301 exists. The back pressure chamber B1 is a space surrounded by the lower end surface of a case 325 of the solenoid 320, the spring support member 307, a central convex portion 347 of the unit body 330, and the like.

The first coil spring 311 is arranged inside the cylindrical portion 301a of the first on-off valve 301 and the lower end thereof is supported on the upper end surface of the conical portion 301b of the first on-off valve 301.

The flow path switching unit 300 has the spring support member 307 which supports the upper end of the first coil spring 311 and a coming-off stopper ring 308 which suppresses upward movement of the sealing member 306.

The spring support member 307 is a donut-shaped thin plate in which a through-hole having a diameter larger than the outer diameter of the central convex portion 347 of the unit body 330 is formed in the central portion. The spring support member 307 is disposed above the first coil spring 311 and the coming-off stopper ring 308 and suppresses the upward movement of the first on-off valve 301 and the first coil spring 311.

Configuration of Fourth On-Off Valve 304

The fourth on-off valve 304 has two cylindrical first portion 391 and second portion 392 having different diameters. The diameter of the first portion 391 is smaller than the diameter of the second portion 392.

The fourth on-off valve 304 has a through-hole 393 which penetrates in the axial direction. The through-hole 393 has a first through-hole 393a and a second through-hole 393b which are cylindrical and have different diameters. The diameter of the first through-hole 393a is larger than the diameter of the second through-hole 393b. To allow the push rod 316 to pass through the inside of the through-hole 393, the diameter of the second through-hole 393b is larger than the diameter of a second shaft portion 318 of the push rod 316 and the diameter of the first through-hole 393a is larger than the diameter of a third shaft portion 319 of the push rod 316. However, in order to suppress the downward movement of the push rod 316, the diameter of the second through-hole 393b is smaller than the diameter of the third shaft portion 319 of the push rod 316.

The second portion 392 has a recess portion 392a recessed from the lower end surface. At the opening of the second through-hole 393b in the recess portion 392a, a recess portion is formed along the shape of the spherical upper end surface of the third on-off valve 303.

Configuration of Control Valve 305

The control valve 305 is a columnar member and has a groove 305a which is recessed over the entire outer peripheral surface. Further, the control valve 305 has a recess portion 305b that is recessed in the axial direction from the upper end surface and a hole 305c which is inclined with respect to the axial direction so as to communicate the recess portion 305b with a portion below the control valve 305.

The control valve 305 is moved downward against the spring force of the coil spring 315 by being pushed downward by an operating rod 324 of the solenoid 320 inserted into the recess portion 305b. On the other hand, when the operating rod 324 moves upward, the control valve 305 moves upward by being pushed by the coil spring 315.

Configuration of Push Rod 316

The push rod 316 has a rod-shaped main body 316a and a disk-shaped washer 700 fitted into the main body 316a. As illustrated in FIG. 4, the main body 316a includes a first shaft portion 317 located on the upper end side, the second shaft portion 318 located on the lower end side, and a third shaft portion 319 located between the first shaft portion 317 and second shaft portion 318. The diameter of the third shaft portion 319 is larger than the diameters of the first shaft portion 317 and the second shaft portion 318. The third on-off valve 303 and the push rod 316 may be integrated.

The washer 700 will be described below in detail.

Configuration of Solenoid 320

The solenoid 320 is a proportional solenoid including a coil 321, a core 322 disposed inside the coil 321, a plunger 323 guided by the core 322, and the operating rod 324 connected to the plunger 323.

The solenoid 320 includes the case 325 which accommodates the coil 321, the core 322, the plunger 323, and the like and a cover 326 which covers an opening of the case 325.

The solenoid 320 configured as described above is energized to the coil 321 through the connector and the lead wire attached to the cap 220, so that an axial thrust is generated in the plunger 323 according to the energized current. Then, the operating rod 324 connected to the plunger 323 moves in the axial direction by the thrust of the plunger 323. In the solenoid 320, an axial thrust is generated in the plunger 323 such that the larger the current supplied to the coil 321, the larger the amount of protrusion of the operating rod 324 from the case 325.

In addition, the amount of power supply to the coil 321 is controlled by a control device 70.

Configuration of Unit Body 330

The unit body 330 has a cylindrical upper end 340 provided on the upper end side and a first cylindrical portion 350 and a second cylindrical portion 360 provided below the upper end 340 and each having a cylindrical shape and an outer diameter different from each other.

A recess portion 342 recessed downward from an upper end surface 341, a recess portion 344 recessed upward from a lower end surface 343, and a communication hole 345 communicating the recess portion 342 and the recess portion 344 are formed at the center of the upper end 340.

The recess portion 342 has an accommodation portion 342a which accommodates the control valve 305 movably. Also, the recess portion 342 includes a lateral recess portion 342b which is continuous with the accommodation portion 342a in the radial direction intersecting the axial direction and which is recessed in the axial direction from the upper end surface of the central convex portion 347 of the upper end 340 to below the lower limit of the movement range of the control valve 305.

In the upper end 340, a recess portion 346 recessed downward from the upper end surface 341 is formed between the recess portion 342 and the outer peripheral surface. The recess portion 346 has three of a first recess portion 346a, a second recess portion 346b, and a third recess portion 346c having cylindrical shapes and different diameters. The upper end 340 is formed with a communication hole 346d which is a hole communicating the second recess portion 346b with the outside in a direction intersecting with the axial direction.

The central convex portion 347 protruding upward from the upper end surface 341 is provided around the recess portion 342 at the center of the upper end 340.

The upper end 340 has a flange portion 348 extending radially outward from the upper end. The flange portion 348 has a notch portion 348a which is partially cut out in a circumferential direction.

Also, in the upper end 340, a first communication hole 349a, which is a radial through-hole communicating the recess portion 342 with the notch portion 348a, and a second communication hole 349b, which is a radial through-hole communicating the recess portion 344 with the outside, are formed.

One first communication hole 349a is formed in the circumferential direction at a position where the lateral recess portion 342b of the recess portion 342 is not formed.

One or more second communication holes 349b are formed in the circumferential direction at portions where the recess portion 346 is not formed.

In the first cylindrical portion 350, the axial communication hole 351 which is an axial through-hole communicating the recess portion 346 with a space formed below the first cylindrical portion 350 and between the outer peripheral surface of the second cylindrical portion 360 and the inner peripheral surface of the cylinder 230 is formed. One or more axial communication holes 351 are formed in the circumferential direction.

On the outer peripheral surface of the first cylindrical portion 350, there are formed a recess portion 352 and a recess portion 353 which are radially recessed over the entire circumference and a male screw 354 which is fastened to a female screw formed at an upper end portion of the cylinder 230.

A sealing member 355 such as an O-ring which seals a gap between the spring length changing unit 250 and the base member 260 is fitted into the recess portion 352.

A sealing member 356 such as an O-ring for sealing a gap against the cylindrical member 230 is fitted in the recess portion 353.

In the first cylindrical portion 350, a third communication hole 357, which is a radial through-hole communicating the inside with the outside, is formed. The axial position of the third communication hole 357 is between the recess portion 352 and the recess portion 353.

At the lower end of the inner peripheral surface of the second cylindrical portion 360, a female screw 361 to which a later-described male screw 373a formed on the outer peripheral surface of the support member 370 is tightened is formed.

Configuration of Support Member 370

The support member 370 has a cylindrical upper end portion 371 located on the upper end side, a cylindrical lower end portion 373 located on the lower end side, and a columnar central portion 372 located therebetween.

In the central portion 372, a plurality (three in this embodiment) of through-holes 372a penetrating in the axial direction are formed around the center line at equal intervals in the circumferential direction. At the upper opening of each through-hole 372a, a recess portion is formed along the shape of the spherical lower end surface of the second on-off valve 302. A groove 372b is formed all around the outer peripheral surface of the central portion 372 and a sealing member 374 such as an O-ring for sealing a gap against the unit body 330 is fitted into the groove 372b.

On the outer peripheral surface of the lower end portion 373, the male screw 373a which is fastened to a female screw formed at the lower end of the unit body 330 is formed. Inside the lower end portion 373, there is provided a collecting member 375 for collecting the dirt in the oil discharged by the pump 600.

The support member 370 is mounted on the unit body 330 by fastening the above-described male screw 373a to the female screw 361 formed on the unit body 330. Then, inside the upper end portion 371, a holding member 378 which holds the three second on-off valves 302, the second coil spring 312, and the three second on-off valves 302 is accommodated. The second on-off valve 302 closes the through-hole 372a by sitting on the upper opening of the through-hole 372a formed in the central portion 372.

Configuration of Holding Member 378

The holding member 378 has two of a cylindrical first portion 378a and a cylindrical second portion 378b having the same inner diameter and different outer diameters. The holding member 378 moves in the axial direction while being supported by a columnar portion 383 of the support member 380.

The holding member 378 receives a downward biasing force from the second coil spring 312, and is positioned at a position where the lower end surface of the second portion 378b is in contact with the three second on-off valves 302.

Configuration of Support Member 380

The support member 380 includes a cylindrical portion 381, the inward portion 382 formed to extend radially inward from the lower end of the cylindrical portion 381, and the columnar portion 383 extending downward from the lower end of the inward portion 382.

The support member 380 is formed with a through-hole 384 which penetrates the inward portion 382 and the columnar portion 383 in the axial direction. The inside of the cylindrical portion 381 and a portion below the columnar portion 383 communicate with each other through the through-hole 384.

The support member 380 is formed with a communication hole 385 which is a radial through-hole that communicates the inside and outside of the cylindrical portion 381. A plurality of communication holes 385 are formed at equal intervals in the circumferential direction.

The inward portion 382 is provided with a convex portion 382a protruding axially upward from the upper end surface. At the opening of the through-hole 384 in the convex portion 382a, a recess portion is formed along the shape of the lower end surface of the third on-off valve 303.

In the cylindrical portion 381 of the support member 380, the fourth on-off valve 304, the third on-off valve 303, the third coil spring 313, the support member 386 which supports the upper end of the third coil spring 313, and a suppression member 387 which suppresses the movement of the third on-off valve 303 in the radial direction are accommodated.

The support member 386 is a donut-shaped thin plate in which a through-hole having a diameter smaller than the diameter of the third on-off valve 303 is formed at the center. The support member 386 supports the upper end of the third coil spring 313 by making the periphery of the through-hole be in contact with the upper end of the third coil spring 313. The third on-off valve 303 is suppressed from moving downward by fitting into the through-hole at the center of the support member 386. The position of the support member 386 is determined at a position where the force received by the support member 386 to move the third on-off valve 303 downward and the upward force received from the third coil spring 313 are balanced. In the embodiment, when the third on-off valve 303 is not pushed from the push rod 316, the spring force of the third coil spring 313 is set such that the third on-off valve 303 closes the lower opening of the second through-hole 393b. On the other hand, when the third on-off valve 303 is strongly pushed from the push rod 316, the third on-off valve 303 is put on the convex portion 382a. Therefore, the spring force of the third coil spring 313 is set so as to close the upper opening of the through-hole 384.

The suppression member 387 is a donut-shaped thin plate having a through-hole 387a having a diameter larger than the diameter of the third on-off valve 303 in the center. By disposing the third on-off valve 303 inside the through-hole 387a of the suppression member 387, the movement of the third on-off valve 303 in the radial direction is suppressed. A plurality of through-holes 387b are formed at equal intervals in the circumferential direction around the through-hole 387a in the suppression member 387 and the oil flows in the axial direction through the plurality of through-holes.

Configuration of Member 395

The member 395 has three of a cylindrical first portion 396, a cylindrical second portion 397, and a cylindrical third portion 398 having the same inner diameter and different outer diameters.

The upward movement of the support member 380 is suppressed by the upper end surface of the cylindrical portion 381 abutting against the lower end surface of the first portion 396. Further, a groove 396a which is depressed over the entire circumference is formed on the outer peripheral surface of the first portion 396. The sealing member 399 such as an O-ring which seals a gap against the unit body 330 is fitted in the groove 396a. The member 395 may be formed integrally with the unit body 330.

The second portion 397 is fitted inside the cylindrical portion 381.

A seal member 314 which is an elastic member such as a donut-shaped resin or rubber is press-fitted between the third portion 398 and the cylindrical portion 381. When the fourth on-off valve 304 comes into contact with the seal member 314, the flow path between the fourth on-off valve 304 and the seal member 314 is sealed.

The third shaft portion 319 of the push rod 316 is arranged inside the member 395. In the embodiment, the inner diameter of the member 395 is smaller than the diameter of the recess portion 344 formed on the upper end 340 of the unit body 330.

Configuration of Support Member 388

The support member 388 is a thin plate having a through-hole in the center in which the columnar portion 383 can be arranged and having a plus (+) shape when viewed from one side in the axial direction. The support member 388 supports the upper end of the second coil spring 312 at the lower end surface.

The downward movement of the support member 388 is suppressed by abutting on the upper end surface of the upper end portion 371 of the support member 370.

The support member 388 is positioned at a position where the downward biasing force received from the leaf spring 389 and the upward biasing force received from the second coil spring 312 are balanced.

Configuration of Support Member 400

As illustrated in FIG. 4, the support member 400 has a cylindrical portion 401 and an inward portion 402 formed from the lower end of the cylindrical portion 401 toward the inside in the radial direction.

On the outer peripheral surface of the upper end of the cylindrical portion 401, a male screw 403 which is tightened to a female screw formed on the cap 220 is formed. The support member 400 holds the unit body 330 between the inward portion 402 and the solenoid 320.

In the flow path switching unit 300 configured as described above, when the current supply to the coil 321 is stopped or a current less than a predetermined first reference current is supplied, the protrusion amount of the operating rod 324 from the case 325 is less than a predetermined first reference amount. In the embodiment, when the protrusion amount of the operating rod 324 is less than the first reference amount, the control valve 305 is disposed at a position where the groove 305a and first communication hole 349a communicate with each other.

When a current equal to or greater than the first reference current is supplied to the coil 321, the protrusion amount of the operating rod 324 from the case 325 is equal to or greater than the first reference amount. When the protrusion amount is equal to or greater than the first reference amount, the operating rod 324 pushes down the control valve 305 so that the axial position of the groove 305a is lower than the first communication hole 349a. When the groove 305a is located below the first communication hole 349a, the groove 305a does not communicate with the first communication hole 349a.

When the coil 321 is supplied with a current equal to or greater than a second reference current which is predetermined to greater than the first reference current, the operating rod 324 moves further downward and the protrusion amount of the operating rod 324 from the case 325 becomes equal to or greater than a second reference amount that is predetermined to be larger than the first reference amount. When the protrusion amount of the operating rod 324 is equal to or larger than the second reference amount, the push rod 316 comes in contact with the control valve 305 and the third on-off valve 303.

When the coil 321 is supplied with a current equal to or greater than a third reference current which is predetermined to be greater than the second reference current, the protrusion amount of the operating rod 324 from the case 325 becomes equal to or larger than a third reference amount that is predetermined to be larger than the second reference amount. When the protrusion amount of the operating rod 324 becomes larger than the second reference amount, the push rod 316 is pushed downward via the control valve 305. By pushing the third on-off valve 303 in a direction away from the opening of the second through-hole 393b with the push rod 316 moved downward in this manner, the third on-off valve 303 moves away from the opening of the second through-hole 393b. The third reference amount will be described below.

When the coil 321 is supplied with a current equal to or greater than a fourth reference current which is predetermined to be greater than the third reference current, the protrusion amount of the operating rod 324 from the case 325 becomes equal to or larger than a fourth reference amount that is predetermined to be larger than the third reference amount. When the protrusion amount of the operating rod 324 is equal to or larger than the fourth reference amount, the third on-off valve 303 pushed by the push rod 316 toward the convex portion 382a side comes in contact with the convex portion 382a, and thus the upper opening of the through-hole 384 is closed by the third on-off valve 303.

In the following, a state where the groove 305a and the first communication hole 349a communicate with each other when the current supply to the coil 321 is stopped or a current less than the first reference current is supplied and the back pressure chamber B1 and the reservoir chamber 40 communicate with each other via the groove 305a is referred to as a first switching state.

Further, a state where, by supplying a current equal to or larger than the first reference current and equal to or less than the second reference current to the coil 321, the control valve 305 is pushed down to a position where the groove 305a and the first communication hole 349a do not communicate with each other, and thus the back pressure chamber B1 and the reservoir chamber 40 do not communicate via the groove 305a and the third on-off valve 303 closes the opening of the second through-hole 393b is referred to as a second switching state.

Further, a state where a current larger than the second reference current is supplied to the coil 321 and the back pressure chamber B1 and the reservoir chamber 40 do not communicate via the groove 305a, and further the third on-off valve 303 does not block both the opening of the second through-hole 393b and the opening of the through-hole 384 is referred to as a third switching state.

Further, a state where a current equal to or larger than the fourth reference current is supplied to the coil 321 and the back pressure chamber B1 and the reservoir chamber 40 do not communicate with each other via the groove 305a, and further the third on-off valve 303 closes the opening of the through-hole 384 is referred to as a fourth switching state. In the fourth switching state, the fourth on-off valve 304 is separated from the seal member 314, as described below.

Operation of Front Fork 21

In the front fork 21 configured as described above, the spring 500 supports the vehicle weight of the motorcycle 1 to absorb the shock and the damping force generating unit 130 damps the vibration of the spring 500.

In the compression stroke of the front fork 21, the piston 131 moves upward with respect to the cylinder 230. Thereby, the oil in the first oil chamber 51 is pushed and the pressure of the oil rises. As a result, the valve 137 opens and the oil flows from the first oil chamber 51 to the second oil chamber 52. This oil flow is throttled at the valve 137 to obtain a damping force during the compression stroke.

The damping force generating unit 130, the rod 150, the cylinder 230, and the like function as a pump for supplying the oil in the cylinder 230 to the jack chamber 60 or the reservoir chamber 40. In the following, those members functioning as a pump will be collectively referred to as "pump 600".

In the extension stroke of the front fork 21, the piston 131 moves downward with respect to the cylinder 230. As a result, the oil in the second oil chamber 52 is pushed and the pressure of the oil rises. As a result, the valve 136 is opened and the oil flows from the second oil chamber 52 into the first oil chamber 51. This oil flow is throttled at the valve 136 to provide a damping force during the extension stroke.

Further, due to the rod 150 exiting from inside the cylinder 230 during the extension stroke, the oil corresponding to the rod exit volume is supplied from the reservoir chamber 40 to the first oil chamber 51.

Oil Flow State According to Switching State of Flow Path Switching Unit 300

Figure 6:
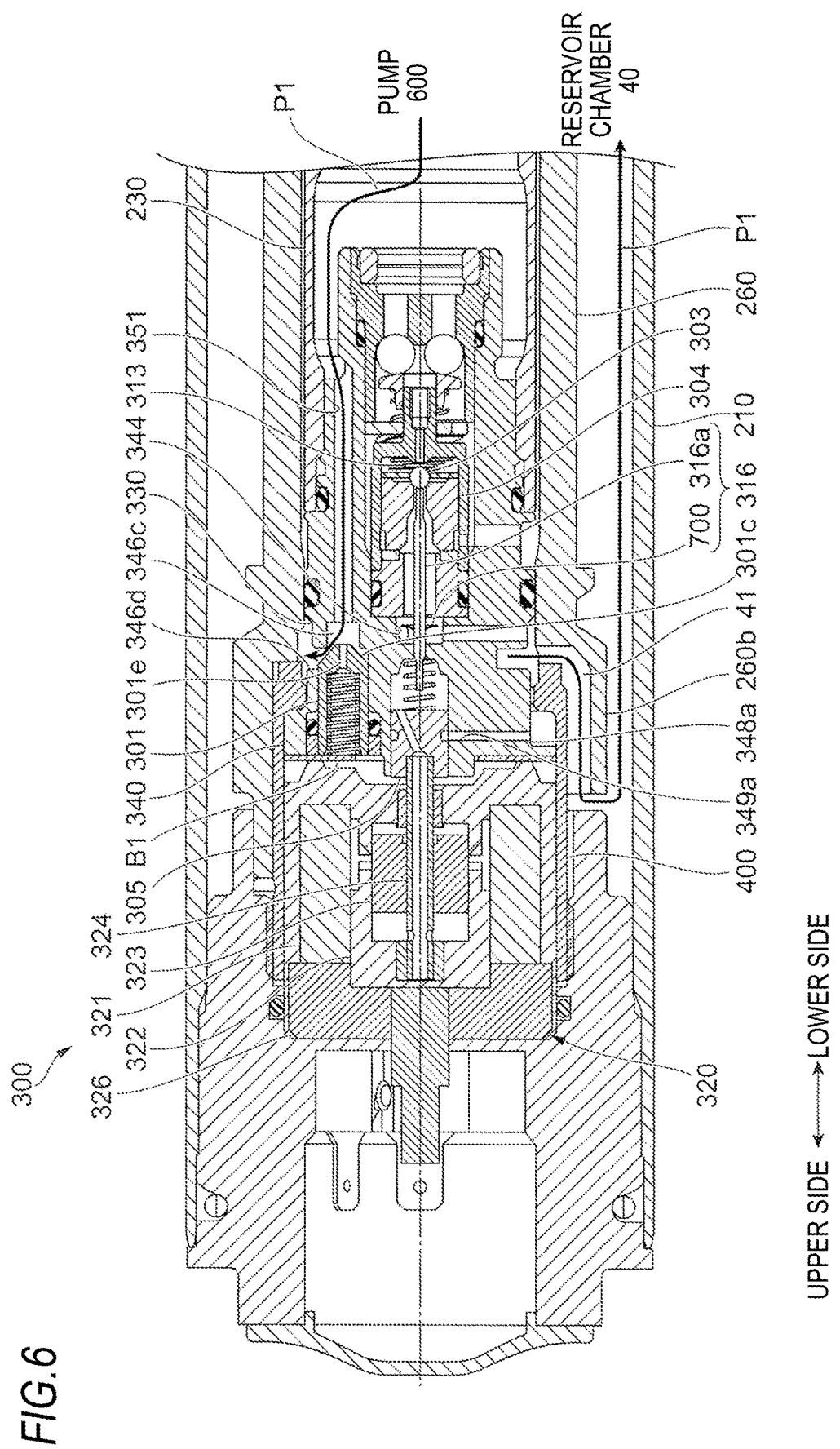
FIG. 6 is a diagram illustrating a flow state of oil in a first switching state.

FIG. 6 is a diagram illustrating a flow state of oil when the flow path switching unit 300 is in the first switching state.

When the flow path switching unit 300 is in the first switching state during the compression stroke of the front fork 21, the oil discharged from the pump 600 flows as shown by an arrow P1 in FIG. 6 and is discharged outside the unit body 330. In this manner, the oil discharged to the outside of the unit body 330 passes through the discharge flow path 41 formed between the radial protrusion portion 260b and the lower end of the support member 400 as shown by the arrow P1 and flows toward the reservoir chamber 40.

In the first switching state, the pressure of the back pressure chamber B1 is low. Therefore, the oil heading upward through the axial communication hole 351 moves the first on-off valve 301 upward and separates the inclined surface 301c from the opening of the third recess portion 346c. Then, the oil which has passed through the gap between the inclined surface 301c and the unit body 330 passes through the communication hole 346d, passes through the discharge flow path 41, and flows toward the reservoir chamber 40.

As described above, the axial communication hole 351, the communication hole 346d, and the discharge flow path 41 function as a first communication path R1 (see FIG. 3) which makes the inside of the cylinder 230 communicate with the reservoir chamber 40.

The axial communication hole 351, the through-hole 301e, the lateral recess portion 342b, the groove 305a, the first communication hole 349a, and the discharge flow path 41 function as a bypass which makes the inside of the cylinder 230 communicate with the reservoir chamber 40. The control valve 305 functions as a valve which controls opening and closing of the first on-off valve 301 by opening or closing this bypass.

Further, the lateral recess portion 342b, the accommodation portion 342a, and the first communication hole 349a formed in the unit body 330 function as a discharge flow path in which oil flows from the back pressure chamber B1 to the reservoir chamber 40. The control valve 305 functions as a valve which controls opening and closing of the first on-off valve 301 by opening or closing the discharge flow path.

Figure 7:
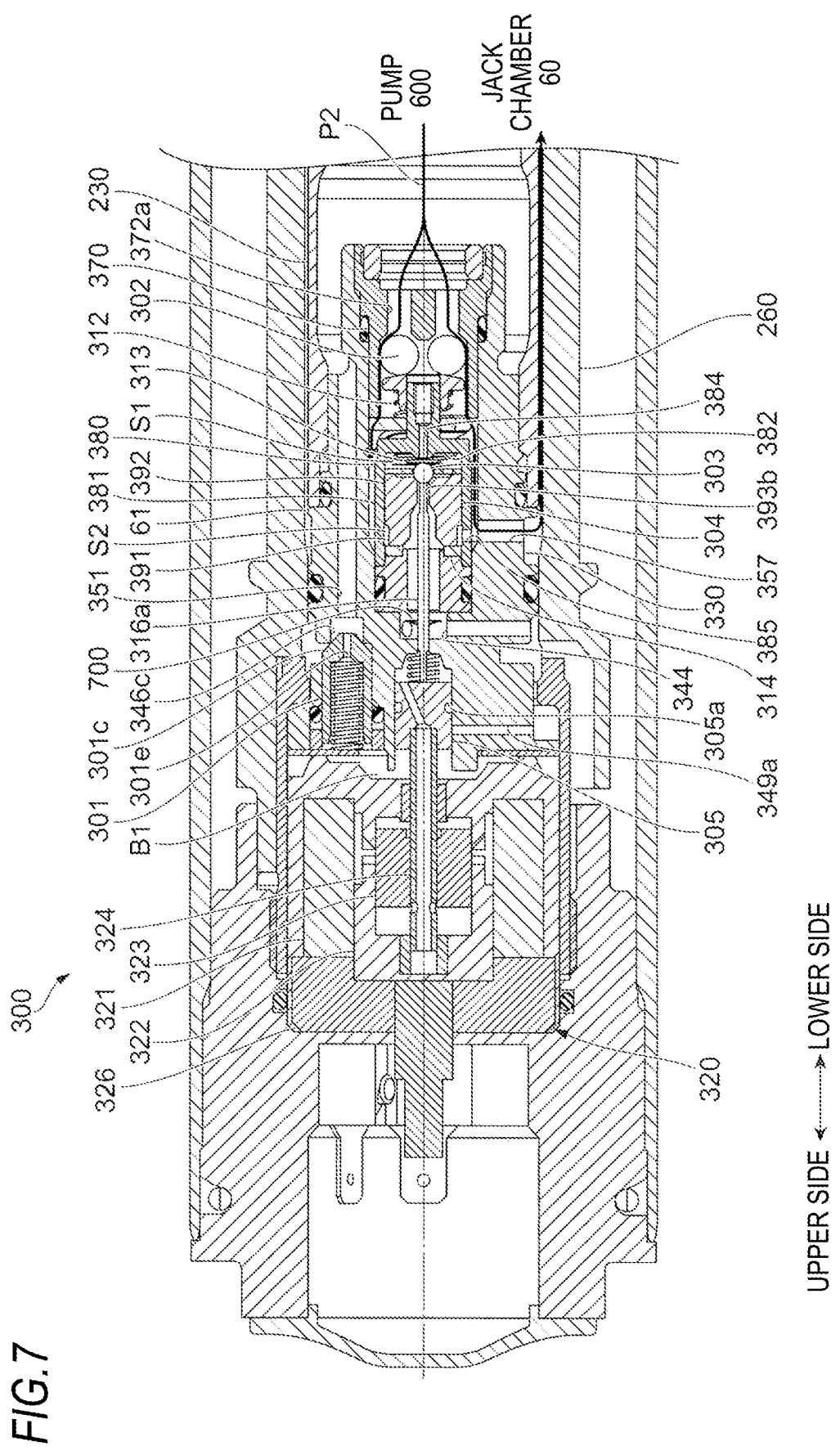
FIG. 7 is a diagram illustrating a flow state of oil in a second switching state.

FIG. 7 is a diagram illustrating the flow state of oil when the flow path switching unit 300 is in the second switching state.

When the flow path switching unit 300 is in the second switching state during the compression stroke of the front fork 21, the back pressure chamber B1 and the reservoir chamber 40 do not communicate with each other via the groove 305a. Therefore, the oil of the back pressure chamber B1 does not flow to the reservoir chamber 40 through the groove 305a. On the other hand, the axial communication hole 351 and the back pressure chamber B1 communicate with each other via the through-hole 301e.

In the second switching state, the first on-off valve 301 closes the first communication path R1. Therefore, the oil discharged from the pump 600 flows as shown by an arrow P2 in FIG. 7 and flows upward through a gap between the outer peripheral surface of the support member 380 and the inner peripheral surface of the unit body 330. The oil then flows through the third communication hole 357 to the outside of the unit body 330. Subsequently, the oil flows through the annular flow path 61 formed between the outer peripheral surface of the cylinder 230 and the inner peripheral surface of the base member 260 toward the jack chamber 60.

Thus, the through-hole 372a of the support member 370, the gap between the outer peripheral surface of the support member 380 and the inner peripheral surface of the unit body 330, the third communication hole 357, and the annular flow path 61 function as a second communication path R2 (see FIG. 3) for communicating the inside of the cylinder 230 and the jack chamber 60. The second on-off valve 302 is a check valve which allows the flow of oil from inside the cylinder 230 to the jack chamber 60 and prevents the flow of oil from the jack chamber 60 into the cylinder 230.

In the case of the second switching state, the third on-off valve 303 closes the opening of the second through-hole 393b. Therefore, a space S1 surrounded by the inner peripheral surface of the cylindrical portion 381, the lower end surface of the second portion 392, and the upper end surface of the inward portion 382 and the jack chamber 60 communicate with each other through the through-hole 384 and the gap between a plurality of adjacent second on-off valves 302 and 302.

In addition, a space S2 between the inner peripheral surface of the cylindrical portion 381 and the outer peripheral surface of the first portion 391 communicates with the jack chamber 60 via the communication hole 385.

As a result, the oil pressure in the space S1 that applies an upward force to the fourth on-off valve 304 and the oil pressure in the space S2 that applies a downward force to the fourth on-off valve 304 are the same. The first pressure receiving area (the area of the lower end surface of the second portion 392) of the fourth on-off valve 304 that receives the pressure of the oil in the space S1 is larger than the second pressure receiving area (the area of the upper end surface of the second portion 392) that receives the pressure of the oil in the space S2. Therefore, the fourth on-off valve 304 remains in contact with the seal member 314.

Figure 8:
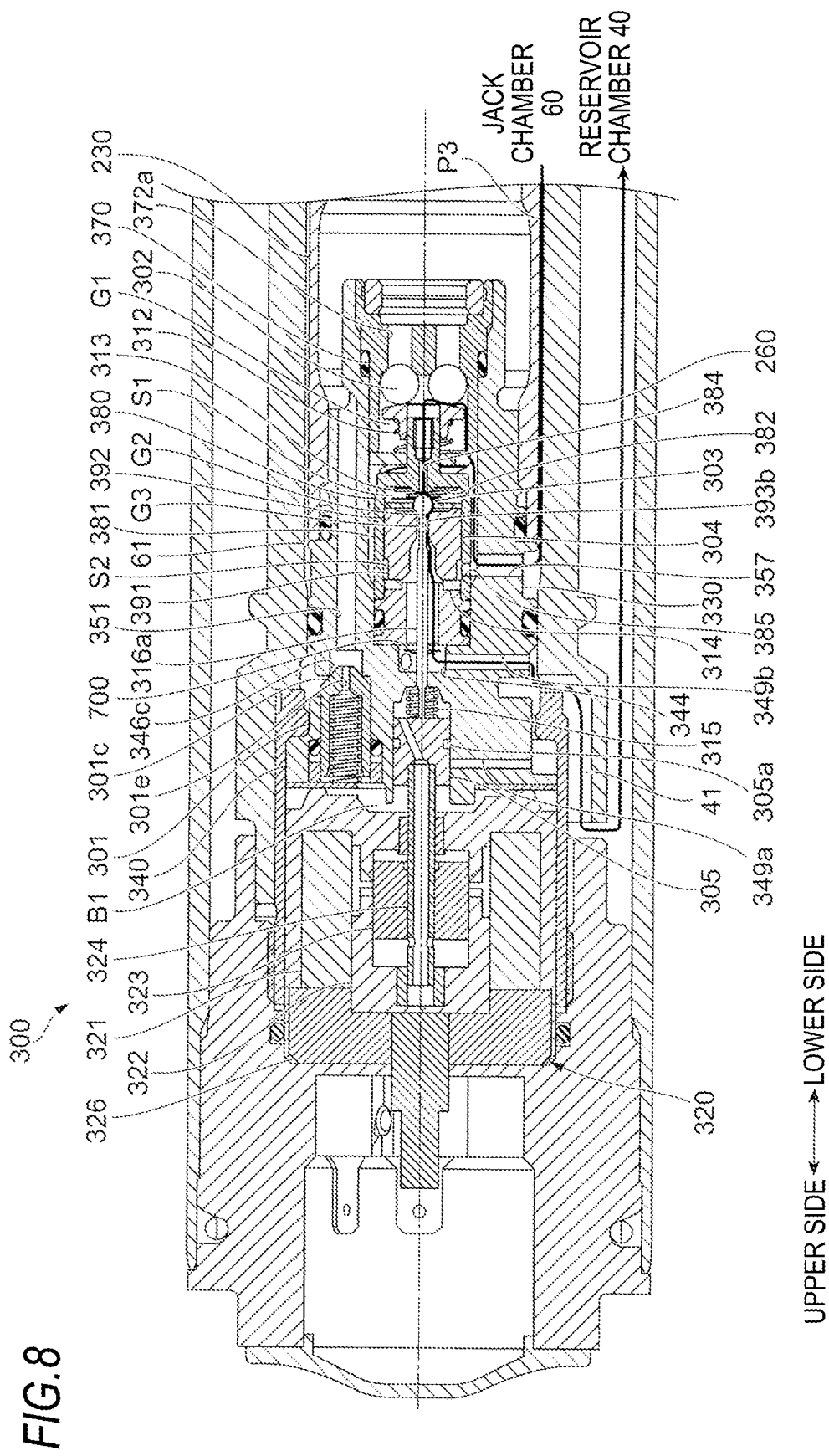
FIG. 8 is a diagram illustrating a flow state of oil in a third switching state.

FIG. 8 is a diagram illustrating the flow state of oil when the flow path switching unit 300 is in the third switching state.

In the third switching state, the oil in the jack chamber 60 flows toward the reservoir chamber 40 as shown by an arrow P3 in FIG. 8. That is, the oil of the jack chamber 60 flows downward through the annular flow path 61, the third communication hole 357, and the gap between the outer peripheral surface of the support member 380 and the inner peripheral surface of the unit body 330, and then the oil enters a gap G1 between the inner peripheral surface of the upper end portion 371 and the outer peripheral surface of the columnar portion 383. The oil in the gap G1 flows upward through the gap between the plurality of adjacent second on-off valves 302 and 302, the through-hole 384, the gap between the third on-off valve 303 and the fourth on-off valve 304, and the gap between the inner peripheral surface of the second through-hole 393b and the outer peripheral surface of the second shaft portion 318. The oil flowing upward passes through the second communication hole 349b and the discharge flow path 41 and flows toward the reservoir chamber 40.

In this way, the annular flow path 61, the third communication hole 357, the gap between the outer peripheral surface of the support member 380 and the inner peripheral surface of the unit body 330, through-hole 384, the gap between the third on-off valve 303 and the fourth on-off valve 304, the gap between the inner peripheral surface of the second through-hole 393b and the outer peripheral surface of the second shaft portion 318, the second communication hole 349b, and the discharge flow path 41 function as a third communication path R3 (see FIG. 3) which communicates the jack chamber 60 with the reservoir chamber 40. The third on-off valve 303 opens or closes the third communication path R3.

In the third communication path R3, the annular flow path 61, the third communication hole 357, the gap between the outer peripheral surface of the support member 380 and the inner peripheral surface of the unit body 330, and the through-hole 384, which are located on the upstream side of the space S1, function as an inflow channel from the jack chamber 60 to the space S1. The third on-off valve 303 also opens or closes this inflow channel.

In the case of the third switching state, the third on-off valve 303 is separated from the opening of the second through-hole 393b so that the gap G2 between the third on-off valve 303 and the opening of the second through-hole 393b becomes the minimum throttle in the third communication path R3. In a state where the third on-off valve 303 is away from the opening of the second through-hole 393b, although the pressure of the oil in the space S1 is smaller than the pressure of the oil in the space S2, the first pressure receiving area is larger than the second pressure receiving area. Therefore, the fourth on-off valve 304 remains in contact with the seal member 314 (the pressure of the oil in the space S1×the first pressure receiving area>the pressure of the oil in the space S2×the second pressure receiving area).

In other words, the following is set so that the fourth on-off valve 304 remains in contact with the seal member 314 in the third switching state. That is, the area of the flow path formed by the gap G2 is made smaller than the area (the minimum area of the inflow channel) of the flow path of through-hole 384 or the area (the minimum area of the flow path located further on the downstream side than the gap G2) of the flow path formed by the gap G3 between the outer peripheral surface of the second shaft portion 318 and the inner peripheral surface of the second through-hole 393b, in such a manner that the third reference amount is set so that the gap G2 becomes the minimum throttle. Also, the third reference amount is set in consideration of the first pressure receiving area and the second pressure receiving area so that the relationship of "the pressure of the oil in the space S1×the first pressure receiving area>the pressure of the oil in the space S2×the second pressure receiving area" is satisfied.

Figure 9:
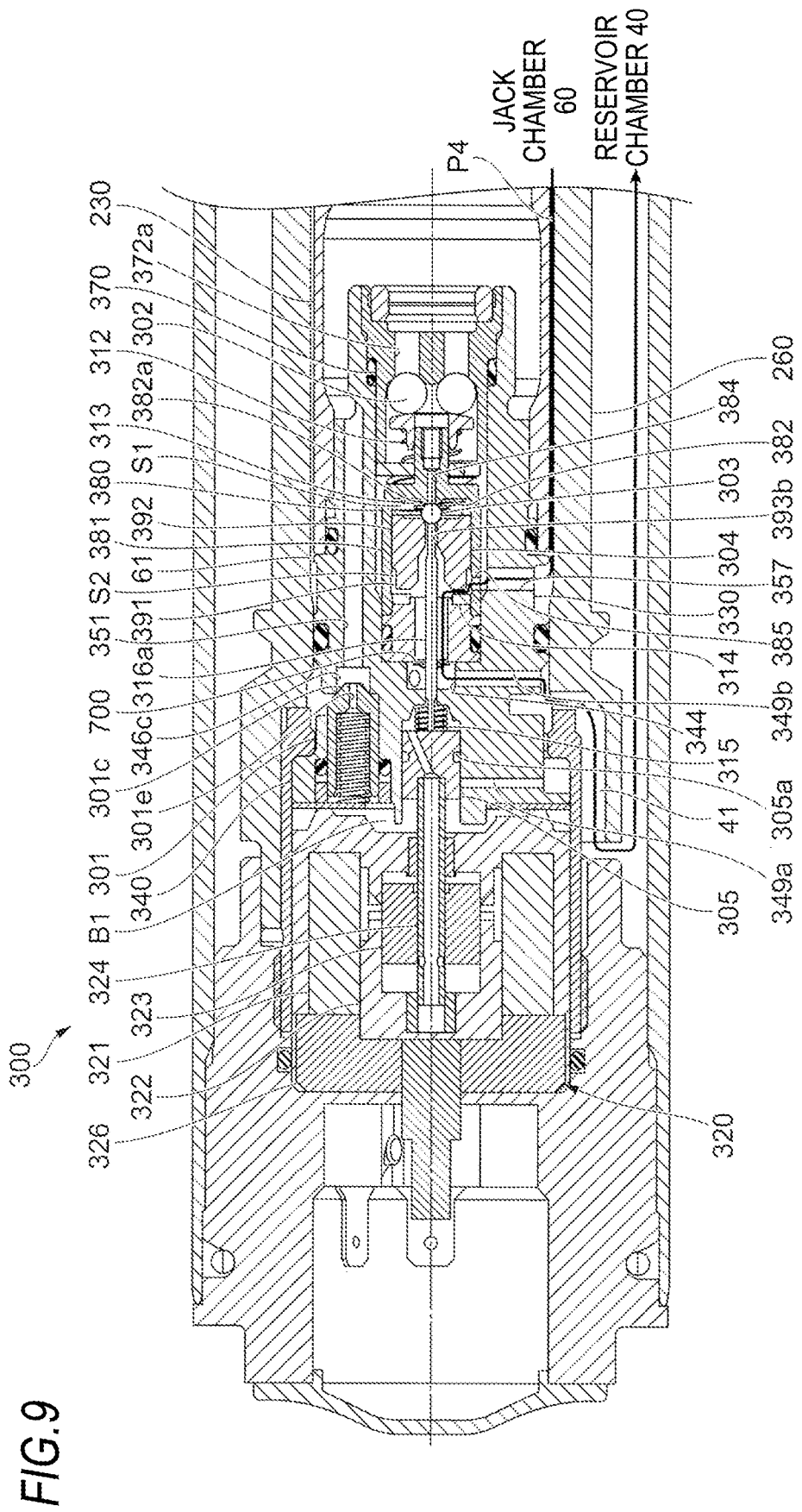
FIG. 9 is a diagram illustrating a flow state of oil in a fourth switching state.

FIG. 9 is a diagram illustrating the oil flow state when the flow path switching unit 300 is in the fourth switching state.

In the case of the fourth switching state, the third on-off valve 303 closes the opening of the through-hole 384, so that little or no oil flows into the space S1. Therefore, even when the pressure of the oil in the space S1 is smaller than that in the third switching state and the first pressure receiving area is larger than the second pressure receiving area, the downward force applied to the fourth on-off valve 304 is greater than the upward force (the pressure of the oil in the space S1×the first pressure receiving area<the pressure of the oil in the space S2×the second pressure receiving area). As a result, the fourth on-off valve 304 moves away from the seal member 314. Therefore, as indicated by an arrow P4 in FIG. 9, the oil in the jack chamber 60 passes through the gap between the fourth on-off valve 304 and the seal member 314 and flows toward the reservoir chamber 40. That is, the oil in the jack chamber 60 flows to the reservoir chamber 40 through the annular flow path 61, the third communication hole 357, the communication hole 385, the gap between the fourth on-off valve 304 and the seal member 314, the second communication hole 349b, and the discharge flow path 41.

As described above, the annular flow path 61, the third communication hole 357, the communication hole 385, the gap between the fourth on-off valve 304 and the seal member 314, the second communication hole 349b, and the discharge flow path 41 function as a fourth communication path R4 (see FIG. 3) which communicates the jack chamber 60 with the reservoir chamber 40. The fourth on-off valve 304 opens or closes the fourth communication path R4.

Raising and Lowering of Vehicle Height

In the front fork 21 acting as described above, when the flow path switching unit 300 is in the second switching state, the oil discharged from the pump 600 flows into the jack chamber 60 during the compression stroke and the amount of oil in the jack chamber 60 increases. As a result, the upper end support member 270 moves downward with respect to the base member 260. As a result, when the spring length of the spring 500 is reduced, the spring force of the spring 500 pressing the upper end support member 270 is larger than before the spring length is reduced. As a result, even when a force is applied from the body frame 11 to the front wheel 2 side, the initial set load (preload) which does not change the relative position between the two increases. In such a case, when the same force acts in the axial direction from the body frame 11 (seat 19) side, the sinking amount of the front fork 21 decreases. Therefore, when the spring length of the spring 500 is reduced as described above, the height of the seat 19 is increased (the vehicle height is increased) as compared to before the spring length is reduced.

On the other hand, when the flow path switching unit 300 is in the third switching state or the fourth switching state, the amount of oil in the jack chamber 60 decreases. As a result, the upper end support member 270 moves upward with respect to the base member 260. As a result, when the spring length of the spring 500 becomes longer, the spring force of the spring 500 pressing the upper end support member 270 becomes smaller than before the spring length becomes longer. In such a case, the initial set load (preload) decreases and the sinking amount of the front fork 21 when the same force acts in the axial direction from the body frame 11 (seat 19) side increases. Therefore, when the spring length of the spring 500 is increased as described above, the height of the seat 19 is reduced (the vehicle height is reduced) as compared to before the spring length is increased. When the flow path switching unit 300 is in the fourth switching state, the amount of oil in the jack chamber 60 is reduced at a higher speed than in the case of the third switching state. As a result, the vehicle height is reduced at a higher speed than in the case of the third switching state.

When the flow path switching unit 300 is in the first switching state, the oil discharged from the pump 600 during the compression stroke flows into the reservoir chamber 40, so that the amount of oil in the jack chamber 60 does not increase or decrease. Therefore, the height of the seat 19 is maintained (the vehicle height is maintained).

In this way, the flow path switching unit 300 according to the embodiment can open any of the communication paths of the first communication path R1, the second communication path R2, and the third communication path R3 according to the supplied current amount. That is, the flow path switching unit 300 can control, in one unit, three control modes according to the current amount: an ascending mode for increasing the vehicle height, a descending mode for decreasing the vehicle height, and a maintaining mode for maintaining the vehicle height. Also, since the third switching state and the fourth switching state are provided, in the descending mode, the flow path switching unit 300 can realize a low-speed descending mode in which the vehicle height can be decreased at a low speed and a high-speed descending mode in which the vehicle height can be decreased at a high speed.

Switching from Descending Mode to Maintaining Mode

Figure 10B:
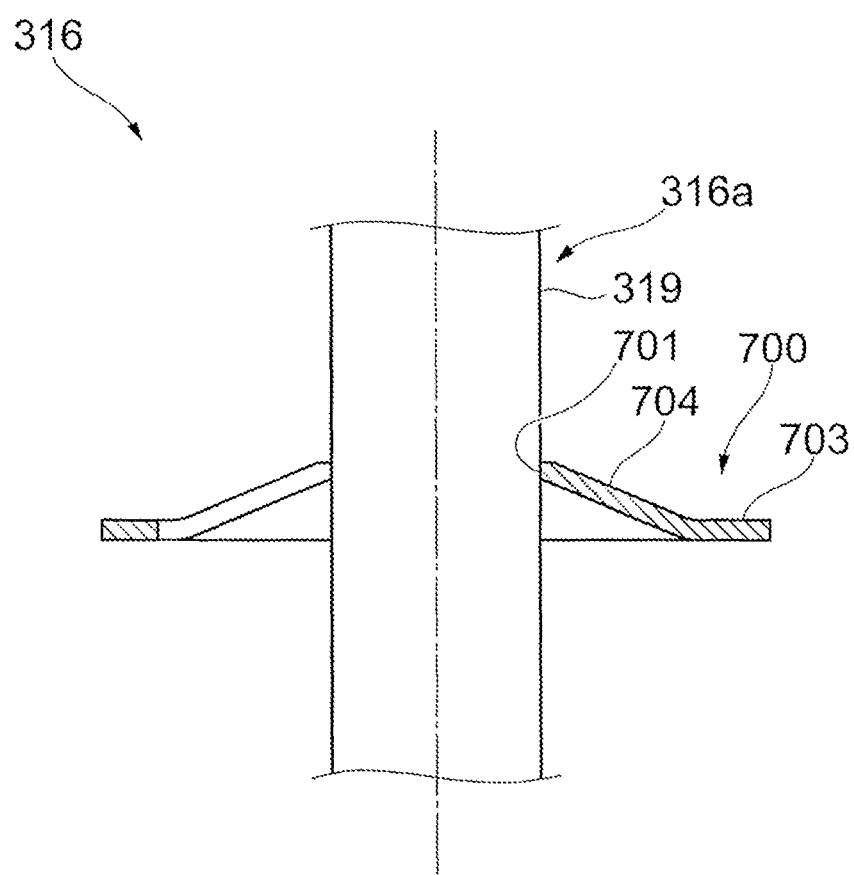
FIG. 10B is a cross-sectional view of a portion XB in FIG. 10A.

FIG. 10A is a diagram illustrating a schematic configuration of the push rod 316. FIG. 10B is a cross-sectional view of a portion XB in FIG. 10A.

The push rod 316 has a washer 700 fitted on the third shaft portion 319. The washer 700 is a disk-shaped metal member having a through-hole 701 formed in the center. In the washer 700, a plurality of (eight in the embodiment) slits 702 are formed at equal intervals in the circumferential direction around the through-hole 701. The washer 700 has a flat portion 703 located further on the outer peripheral side than the slit 702 and an inclined portion 704 between the slits 702 and inclined with respect to the flat portion 703. The tips of the plurality of inclined portions 704 face the substantially circular through-hole 701. The diameter of the through-hole 701 is smaller than the outer diameter of the third shaft portion 319 and the washer 700 is fitted into the third shaft portion 319 by being press-fitted into the third shaft portion 319. The washer 700 and the main body 316a move integrally as a result of the frictional force between the tip of the inclined portion 704 and the outer peripheral surface of the third shaft portion 319.

The washer 700 is fitted into the main body 316a such that the inclined portion 704 is located above the flat portion 703.

In the flow path switching unit 300, since the push rod 316 has the washer 700 protruding outward from the outer peripheral surface of the third shaft portion 319, the switching is quickly performed from the fourth switching state to the first switching state. Hereinafter, this phenomenon will be described in comparison with a configuration in which the push rod 316 does not have the washer 700.

It is possible to consider a case where the flow path switching unit 300 is set to the first switching state in order to maintain the vehicle height when the flow path switching unit 300 is set to the fourth switching state in order to lower the vehicle height.

When the flow path switching unit 300 is in the fourth switching state, as illustrated in FIG. 9, the oil in the jack chamber 60 reaches the reservoir chamber 40 via the fourth communication path R4 (see FIG. 3). When the power supply to the coil 321 is stopped to make the state become the first switching state during the fourth switching state, the protrusion amount of the operating rod 324 becomes less than the first reference amount. Then, the control valve 305 receives the force from the control valve coil spring 315 and moves upward. In the case of the fourth switching state, the flat portion 703 and the inclined portion 704 of the washer 700 receive a force from the oil flowing from the jack chamber 60 to the reservoir chamber 40. This causes the push rod 316 to move upward. When the push rod 316 moves upward, the third on-off valve 303 receiving the force from the third coil spring 313 moves upward and the third on-off valve 303 moves away from the convex portion 382a. This allows the oil to flow through the through-hole 384. As a result, The fourth on-off valve 304 moves upward by receiving the force from the third on-off valve 303 and the force from the oil that has reached the space S1 through the annular flow path 61, the third communication hole 357, the gap between the outer peripheral surface of the support member 380 and the inner peripheral surface of the unit body 330, and the through-hole 384 and closes the fourth communication path R4. When the fourth communication path R4 is closed, the state of the flow path switching unit 300 becomes the first switching state. As a result, the vehicle height is maintained.

On the other hand, when the push rod 316 does not have the washer 700, the push rod 316 receives less force from the upward flowing oil than when the push rod 316 has the washer 700. Further, the oil discharged from the pump 600 during the compression stroke of the front fork 21 causes a high pressure at the upper end portion of the third shaft portion 319, so that the push rod 316 is prevented from moving upward. In addition, a downward force acts on the push rod 316 by gravity. As a result, when the push rod 316 does not have the washer 700, it is difficult for the push rod 316 to move upward.

Since the push rod 316 has the washer 700, the push rod 316 can be quickly moved upward when the power supply to the coil 321 is stopped when the flow path switching unit 300 is in the fourth switching state.

The size of the washer 700 can be set, for example, as follows. That is, it is preferable that the force (the pressure of the oil×(the sum (hereinafter sometimes referred to as "washer pressure receiving area") of the cross-sectional area of the flat portion 703 and the area of the inclined portion 704 in the direction perpendicular to the axial direction)) received by the washer 700 from the oil flowing from the jack chamber 60 to the reservoir chamber 40 be set to be larger than the force obtained by adding the force generated by the gravitational force to the force (the pressure×the cross section of the third shaft portion 319) generated by the pressure generated in the back pressure chamber B1 in the early stage of the compression stroke of the front fork 21.

On the other hand, when the washer pressure receiving area is increased, the flow path of the oil flowing from the jack chamber 60 to the reservoir chamber 40 becomes narrower. Therefore, the area (hereinafter, it may be referred to as "washer section flow path area".) obtained by subtracting the washer pressure receiving area from the cross-sectional area of the recess portion 344 in which the washer 700 is accommodated is preferably set to be larger than the upstream flow path area. For example, it is preferable that the washer section flow path area be set to be larger than the total area obtained by multiplying the cross-sectional area of the communication hole 385 by the number of the communication holes 385.

The position where the washer 700 is arranged is not particularly limited as long as it is on the fourth communication path R4. For example, the washer 700 can be disposed above the lower end surface of the member 395 which covers the opening of the support member 380 and below the second communication hole 349b.

In the embodiment, since the diameter of the recess portion 344 is larger than the inner diameter of the member 395, the washer 700 is arranged so as to be accommodated in the recess portion 344. By arranging the washer 700 in the recess portion 344, the washer pressure receiving area can be increased compared to the case where the washer 700 is arranged inside the member 395. As a result, the push rod 316 can be moved upward more quickly.

The washer 700 may be located inside the member 395.

Further, the washer 700 is fitted into the main body 316a such that the inclined portion 704 is located above the flat portion 703. This makes it difficult for the washer 700 to fall off from the main body 316a. The washer 700 receives a moment in the direction in which the tip of the inclined portion 704 moves inward due to the upward force that the flat portion 703 receives from the oil. As a result, when the force is applied to the washer 700 from the oil, the frictional force between the tip of the inclined portion 704 and the outer peripheral surface of the third shaft portion 319 increases, so that the washer 700 does not easily fall off from the main body 316a. In contrast, when the washer 700 is fit to the main body 316a so that the inclined portion 704 is located below the flat portion 703, the washer 700 receives a moment in the direction in which the tip of the inclined portion 704 moves outward due to the upward force that the flat portion 703 receives from the oil. As a result, when the force is applied from the oil to the washer 700, the frictional force between the tip of the inclined portion 704 and the outer peripheral surface of the third shaft portion 319 is reduced, so that the washer 700 is likely to fall off from the main body 316a.

In this way, by disposing the inclined portion 704 above the flat portion 703, it becomes difficult for the washer 700 to fall off from the main body 316a, so that the main body 316a and the washer 700 can be accurately and integrally moved.

In the washer 700, a plurality of slits 702 are formed around the through-hole 701. Accordingly, when the push rod 316 is pushed by the control valve 305 and moves downward, the oil can move upward through the slit 702, so that the push rod 316 can easily move straight downward without swinging in a lateral direction. Therefore, even when the push rod 316 has the washer 700, it is possible to move the third on-off valve 303 downward with high accuracy.

The above-described flow path switching unit 300 is an example of a flow path control device for a motorcycle. In the flow path switching unit 300, the first state can be exemplified as a state in which the third on-off valve 303 closes the opening of the second through-hole 393b of the fourth on-off valve 304 and the second state can be exemplified as a state where the third on-off valve 303 is in contact with the convex portion 382a of the inward portion 382 of the support member 380.

The front fork 21 is an example of a vehicle height adjustment device for a motorcycle.

In the flow path switching unit 300, when the oil flows from the jack chamber 60 to the reservoir chamber 40 via the fourth communication path R4, if one end of the push rod 316 is no longer pressed by the control valve 305 (when the power supply to the coil 321 is stopped), the washer 700 moves under the pressure from the oil. As a result, the third on-off valve 303 quickly enters the first state and the fourth on-off valve 304 quickly moves to the position where the fourth communication path R4 is closed. Then, when the fourth communication path R4 is closed, the oil does not flow from the jack chamber 60 to the reservoir chamber 40. As a result, the vehicle height is suppressed from being reduced even though the power supply to the coil 321 is stopped.

Here, a part of the fourth communication path R4 is formed in the space between the outer peripheral surface of the main body 316a and the inner peripheral surface of the unit body 330 and the member 395 covering the outer periphery of the main body 316a and the washer 700 is located in this space. Thereby, the push rod 316 can receive the pressure of the oil flowing from the jack chamber 60 to the reservoir chamber 40 with high accuracy.

Also, a protruding portion protruding radially outward of the main body 316a from the outer peripheral surface of the main body 316a so as to receive the pressure of the oil flowing from the jack chamber 60 toward the reservoir chamber 40 is formed by the washer 700 fitted into the main body 316a. Accordingly, since the protruding portion can be formed by fitting the washer 700 into the main body 316a, it is possible to receive the pressure of the oil flowing from the jack chamber 60 to the reservoir chamber 40 with a simple configuration. The washer 700 is illustrated as having a disk shape, but may have another shape such as a rectangular shape.

Further, in the washer 700, the through-hole 701 in which the main body 316a is fitted is formed at a central portion and the inclined portions 704 inclined with respect to the axial direction of the main body 316a are formed around the through-hole 701. The diameter of the inclined portion 704 decreases as it goes in a direction (upward) where the oil flows from the jack chamber 60 toward the reservoir chamber 40. Thereby, the washer 700 can be made hard to fall off from the main body 316a and the main body 316a and the washer 700 can be integrally moved.

In the washer 700 of the push rod 316, the slits 702 as an example of a plurality of holes penetrating in the axial direction of the main body 316a are formed. As a result, when the push rod 316 moves downward, the oil moves upward through the slits 702, so that the push rod 316 can be moved straight downward without swinging in the lateral direction.

First Modification Example of Push Rod

FIG. 11A is a diagram illustrating a schematic configuration of a push rod 416 according to a first modification. FIG. 11B is a cross-sectional view of a portion XIB in FIG. 11A.

The push rod 416 according to the first modified example is different in that a main body 416a is provided instead of the main body 316a of the push rod 316. The main body 416a is different from the main body 316a in that a groove 416b recessed from the outer peripheral surface is formed. Hereinafter, points different from the main body 316a will be described. Parts having the same shape and function in the main body 416a and the main body 316a are denoted by the same reference numerals and letters and detailed description thereof will be omitted.

In the main body 416a, a groove 416b recessed from the outer peripheral surface is formed in the third shaft portion 319 over the entire circumference. A tip of the inclined portion 704 is fitted into the groove 416b.

As described above, the groove 416b may be formed in the main body 416a and the tip of the inclined portion 704 may be fitted into the groove 416b.

With such a configuration, even when the flat portion 703 receives pressure from the oil, the tip of the inclined portion 704 is fitted into the groove 416b, so that the washer 700 does not easily fall off the main body 416a. As a result, the main body 416a and the washer 700 move as one unit with high accuracy. Further, since the position of the washer 700 with respect to the main body 416a is determined with high accuracy, the washer 700 can be easily assembled to the main body 416a.

Also, even when it is configured such that the inclined portion 704 is fitted so as to be located below the flat portion 703, the tip of the inclined portion 704 is fitted into the groove 416b, so that the washer 700 cannot be easily fallen off from the main body 416a.

Second Modification Example of Push Rod

FIG. 12A is a diagram illustrating a schematic configuration of a push rod 516 according to a second modification example. FIG. 12B is a cross-sectional view of a portion XIIB in FIG. 12A.

The push rod 516 according to the second modification example is different from the push rod 316 in that a washer 710 is provided instead of the washer 700 of the push rod 316. The washer 710 differs from the washer 700 in that a hole 711 is formed. Hereinafter, differences from the washer 700 will be described. Parts having the same shape and function in the washer 710 and the washer 700 are denoted by the same reference numerals and letters and detailed description thereof will be omitted.

In the washer 710, a plurality of holes 711 which communicate the upper part and the lower part of the washer 710 are formed in a flat portion 713 and an inclined portion 714.

As described above, a plurality of holes 711 penetrating in the axial direction of the main body 316a may be formed in the washer 710. Since the plurality of holes 711 are formed, the oil moves upward through the holes 711 when the push rod 516 moves downward, so that the push rod 516 can easily move straight downward without swinging in the lateral direction.

Third Modification Example of Push Rod

FIG. 13A is a diagram illustrating a schematic configuration of a push rod 616 according to a third modification example. FIG. 13B is a cross-sectional view of a portion XIIIB in FIG. 13A.

The push rod 616 according to the third modification example is different from the push rod 316 in that a washer 720 is provided instead of the washer 700 of the push rod 316. The washer 720 differs from the washer 700 in that the outer peripheral portion is curved. Hereinafter, differences from the washer 700 will be described. Parts having the same shape and function in the washer 720 and the washer 700 are denoted by the same reference numerals and letters and detailed description thereof will be omitted.

The washer 720 has an inclined portion 704 between the slits 702 and a curved portion 725 which is located on the outer peripheral side of the slit 702. The diameter of the curved portion 725 decreases as it goes in a direction (upward) where the oil flows from the jack chamber 60 toward the reservoir chamber 40. Since the washer 720 has the curved portion 725, the vortex generated on the upper surface of the curved portion 725 when the push rod 616 moves downward is reduced. As a result, the washer 720 is prevented from vibrating in the lateral direction due to the vortex generated on the upper surface of the curved portion 725, so that the tip of the inclined portion 704 of the washer 720 is suppressed from being worn.

Fourth Modification Example of Push Rod

Figure 14A:
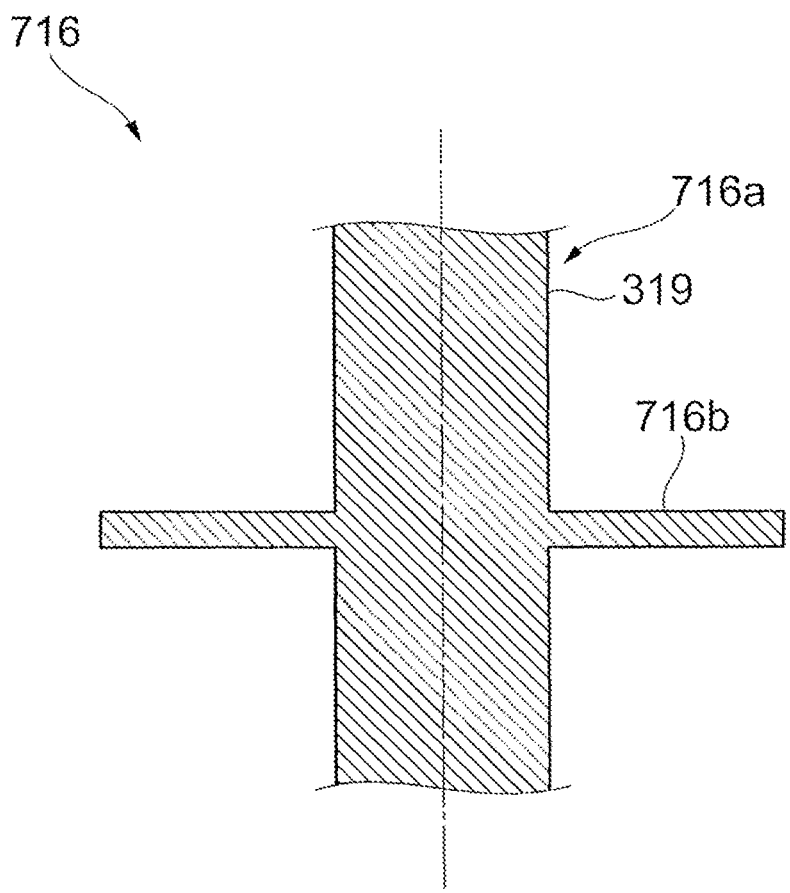
FIG. 14A is a diagram illustrating a schematic configuration of a push rod 716.

FIGS. 14A and 14B are diagrams illustrating a schematic configuration of a push rod 716 according to a fourth modification example.

The push rod 716 according to the fourth modification example is different from the push rod 316 in that a rod-shaped main body 716a and a protruding portion 716b which protrudes outward from the outer peripheral surface of the main body 716a are integrally formed. Hereinafter, points different from the push rod 316 will be described. In the push rod 716 and the push rod 316, parts having the same shape and function are denoted by the same reference numerals and letters and detailed description thereof will be omitted.

The main body 716a includes a first shaft portion 317, a second shaft portion 318, and a third shaft portion 319, similarly to the main body 316a. Further, as illustrated in FIGS. 14A and 14B, the main body 716a and the protruding portion 716b are provided integrally by joining the protruding portion 716b to the third shaft portion 319.

As described above, the protruding portion 716b may be formed integrally with the main body 716a. Thus, the protruding portion 716b can be prevented from falling off from the main body 716a with high accuracy and the main body 716a and the protruding portion 716b can be integrally moved with high accuracy.

As a method for integrally providing the protruding portion 716b on the third shaft portion 319 (main body 716a), as illustrated in FIG. 14A, cutting a columnar member can be exemplified. Further, as illustrated in FIG. 14B, for example, welding of a donut-shaped thin plate 716d having a through-hole 716c at the center portion to the main body 716a can be exemplified. In the case of the embodiment illustrated in FIG. 14B, the thin plate 716d functions as the protruding portion 716b.

Fifth Modification Example of Push Rod

Figure 15:
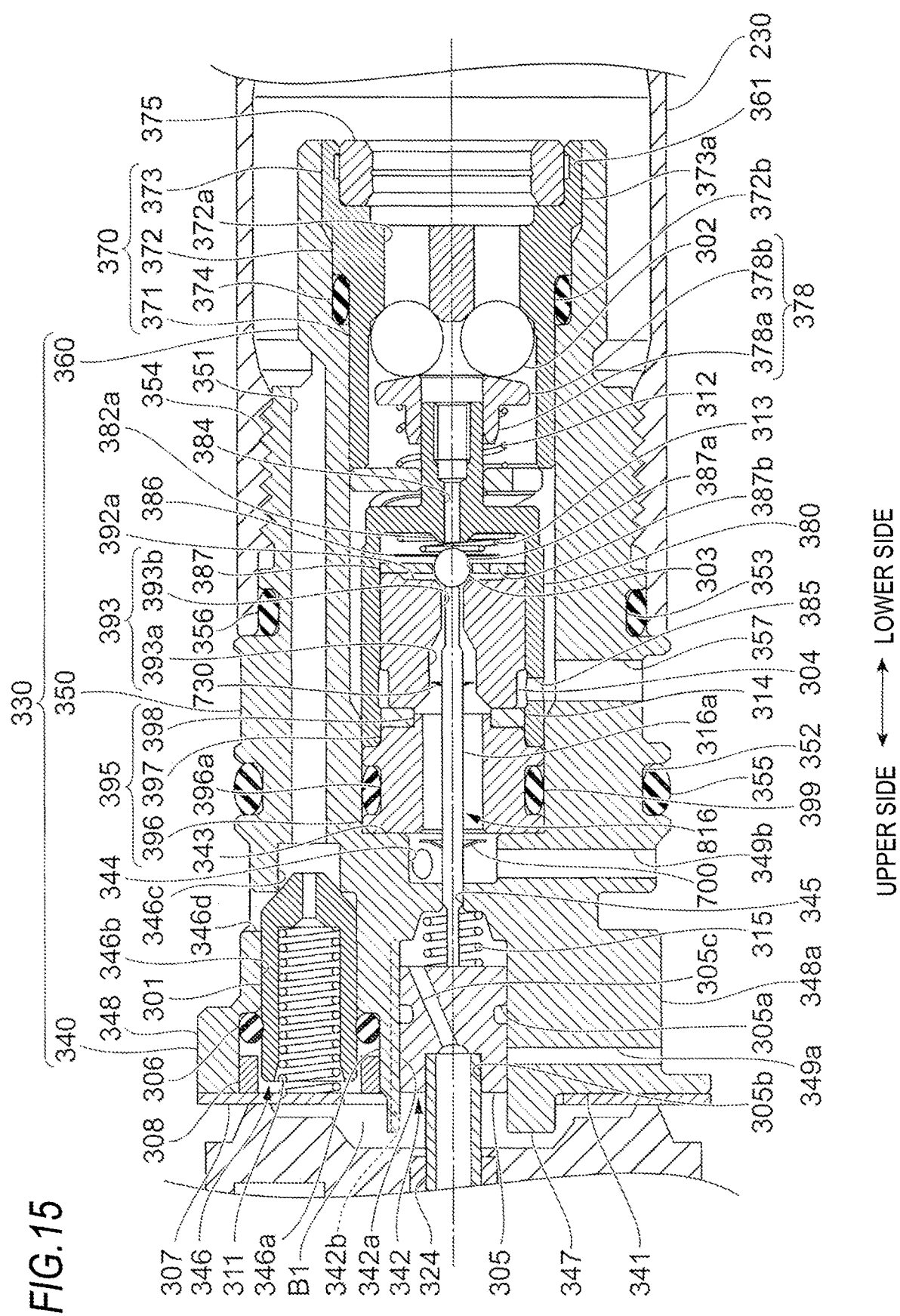
FIG. 15 is a diagram illustrating a schematic configuration of a flow path switching unit 300 including a push rod 816.

FIG. 15 is a diagram illustrating a schematic configuration of the flow path switching unit 300 including a push rod 816 according to a fifth modification example.

Figure 16A:
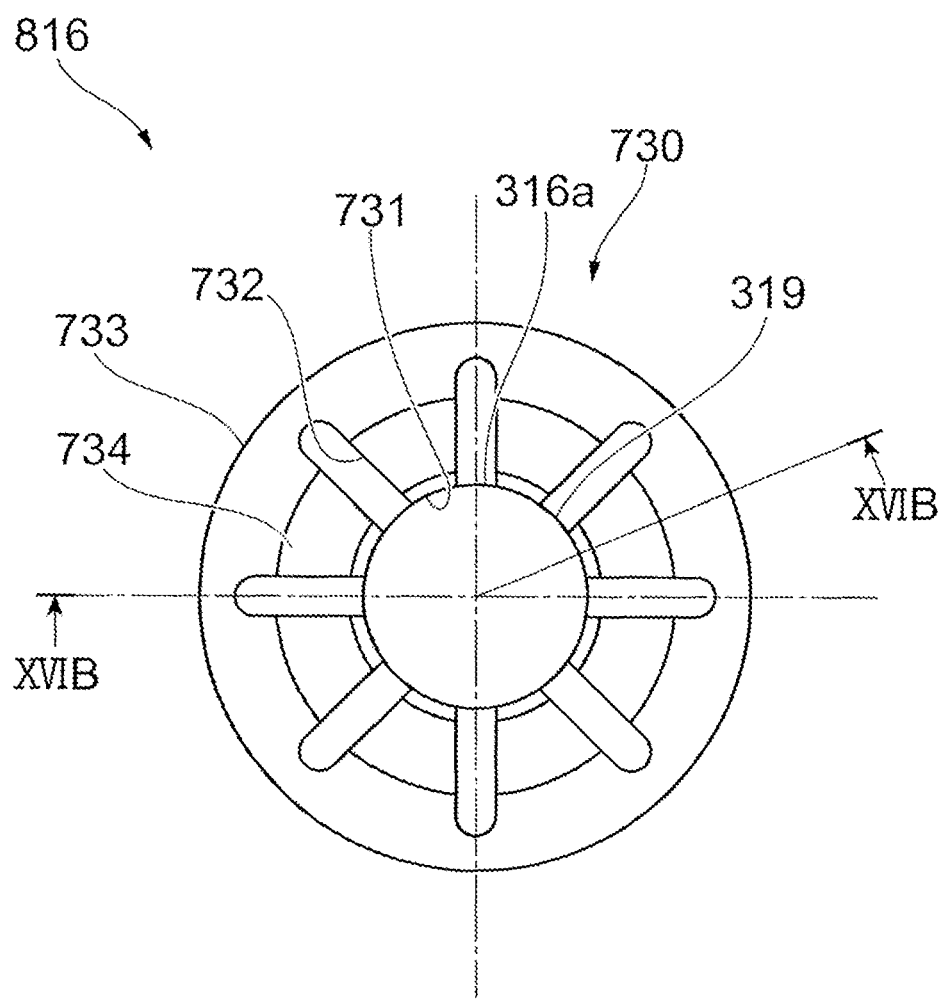
FIG. 16A is a diagram showing a schematic configuration of the push rod 816.
Figure 16B:
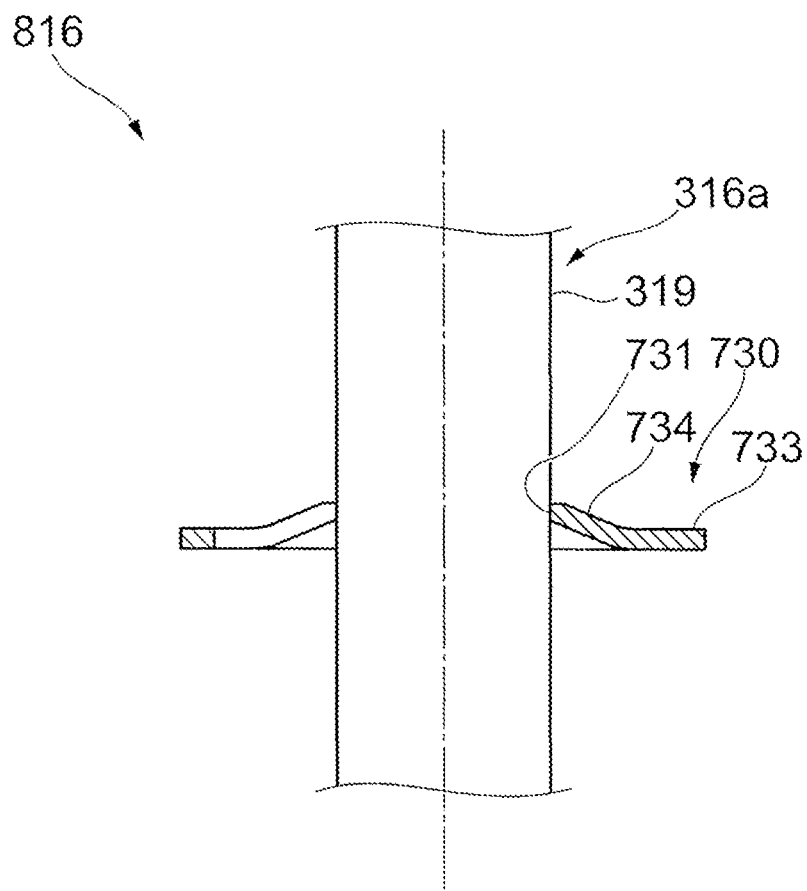
FIG. 16B is a cross-sectional view of a portion XVIB in FIG. 16A.

FIG. 16A is a diagram illustrating a schematic configuration of the push rod 816. FIG. 16B is a cross-sectional view of a portion XVIB in FIG. 16A.

The push rod 816 differs from the push rod 316 in that a disc-shaped inner washer 730 is provided inside the fourth on-off valve 304. Hereinafter, differences from the push rod 316 according to the above-described embodiment will be described. In the push rod 816 according to the fifth modification example and the push rod 316, parts having the same shape and function are denoted by the same reference numerals and letters and detailed description thereof will be omitted.

As illustrated in FIG. 15, the push rod 816 has a main body 316a, a washer 700, and the inner washer 730 fitted into the third shaft portion 319.

As illustrated in FIG. 16A, the inner washer 730 is a disk-shaped metal member having a through-hole 731 formed in the center and a plurality of (eight in the embodiment) slits 732 are formed around the through-hole 731 at equal intervals in the circumferential direction. The inner washer 730 has a flat portion 733 located on the outer peripheral side of the slit 732 and an inclined portion 734 between the slits 732 and inclined with respect to the flat portion 733. The tips of the plurality of inclined portions 734 face the substantially circular through-hole 731. The hole diameter of the through-hole 731 is smaller than the outer diameter of the third shaft portion 319 and the inner washer 730 is fitted into the third shaft portion 319 by being press-fitted into the third shaft portion 319. The inner washer 730 and the main body 316a move integrally due to the frictional force between the tip of the inclined portion 734 and the outer peripheral surface of the third shaft portion 319.

The inner washer 730 is fitted to the main body 316a so as to be located within the first through-hole 393a. The inner washer 730 is fitted to the main body 316a such that the inclined portion 734 is located above the flat portion 733.

Then, in the flow path switching unit 300 including the push rod 816, the switch from the third switching state to the first switching state is quickly performed because the push rod 816 has the inner washer 730. Hereinafter, this phenomenon will be described in comparison with a configuration in which the push rod 816 does not have the inner washer 730.

It is possible to consider the case where the flow path switching unit 300 is set to the first switching state to maintain the vehicle height when the flow path switching unit 300 is set to the third switching state to reduce the vehicle height.

When the flow path switching unit 300 is in the third switching state, as illustrated in FIG. 8, the oil in the jack chamber 60 reaches the reservoir chamber 40 via the third communication path R3. When the power supply to the coil 321 is stopped to make the first switching state during the third switching state, the protrusion amount of the operating rod 324 becomes less than the first reference amount. Therefore, the control valve 305 receives the force from the control valve coil spring 315 and moves upward. In the third switching state, the flat portion 733 and the inclined portion 734 of the inner washer 730 receive a force from the oil flowing from the jack chamber 60 to the reservoir chamber 40. This causes the push rod 816 to move upward. When the push rod 816 moves upward, the third on-off valve 303 receiving the force from the third coil spring 313 moves upward. Therefore, the third communication path R3 is closed by the third on-off valve 303 closing the opening of the second through-hole 393b. As a result, the flow path switching unit 300 enters the first switching state and the vehicle height is maintained.

On the other hand, when the push rod 816 does not have the inner washer 730, the push rod 816 receives less force from the oil flowing upward than when the push rod 816 has the inner washer 730. Further, the oil discharged from the pump 600 during the compression stroke of the front fork 21 causes a high pressure at the upper end portion of the third shaft portion 319, so that the push rod 816 is prevented from moving upward. In addition, a downward force acts on the push rod 816 by gravity. As a result, when the push rod 816 does not have the inner washer 730, the push rod 816 is difficult to move upward.

Since the push rod 816 has the inner washer 730, the push rod 816 can be quickly moved upward when the power supply to the coil 321 is stopped when the flow path switching unit 300 is in the third switching state.

The size of the inner washer 730 can be set, for example, as follows. That is, it is preferable that the size be set such that a force (the pressure of the oil×(the sum (hereinafter, may be referred to as "inner washer pressure receiving area") of the cross-sectional area of the flat portion 733 and the area of the inclined portion 734 in the direction perpendicular to the axial direction))) received by the inner washer 730 from the oil flowing from the jack chamber 60 toward the reservoir chamber 40 becomes larger than a force obtained by adding a force caused by gravity to a force (the pressure×the cross-sectional area of the third shaft portion 319) caused by the pressure generated in the back pressure chamber B1 at the beginning of the compression stroke of the front fork 21.

On the other hand, when the inner washer pressure receiving area is increased, the flow path of the oil flowing from the jack chamber 60 to the reservoir chamber 40 becomes narrower. Therefore, the area (hereinafter, it may be referred to as "inner washer section flow path area".) obtained by subtracting the inner washer pressure receiving area from the cross-sectional area of the first through-hole 393*a* in which the inner washer 730 is accommodated is preferably set to be larger than the upstream flow path area. For example, the inner washer section flow path area may be set to be larger than the cross-sectional area of the gap between the inner peripheral surface of the second through-hole 393*b* and the outer peripheral surface of the second shaft portion 318.

The inner washer 730 is fitted to the main body 316*a* such that the inclined portion 734 is located above the flat portion 733. This makes it difficult for the inner washer 730 to drop off from the main body 316*a*.

Further, since forming a plurality of slits 732 around the through-hole 731, when the push rod 816 is pushed by the control valve 305 and moves downward, the push rod 816 easily moves straight downward without swinging in the lateral direction.

As described above, in the flow path switching unit 300 including the push rod 816, the third communication path R3 as an example of a detour is provided inside the fourth on-off valve 304 and the push rod 816 has the inner washer 730. Thus, when the power supply to the coil 321 is stopped when the flow path switching unit 300 is in the third switching state, it is possible to move upward more quickly than the configuration where the push rod 816 does not have the inner washer 730. As a result, the third on-off valve 303 is quickly brought into the first state and the third communication path R3 is closed, so that oil does not flow from the jack chamber 60 to the reservoir chamber 40. As a result, the vehicle height is suppressed from being reduced even though the power supply to the coil 321 is stopped.

In addition, similarly to the case where the push rod 416 has the groove 416*b*, the push rod 816 may also be configured such that a groove recessed from the outer peripheral surface is formed in the third shaft portion 319 over the entire circumference and the tip of the inclined portion 734 is fitted into the groove. With this configuration, the inner washer 730 can be made hard to fall off from the main body 316*a*.

Also, similarly to the case where the washer 710 of the push rod 516 has a plurality of holes 711, the push rod 816 may also have a plurality of axially penetrating holes in the inner washer 730. By having the plurality of holes, when the push rod 816 moves downward, the push rod 816 can easily move straight downward without swinging in the lateral direction.

Further, similarly to the case where the washer 720 of the push rod 616 has the curved portion 725, the inner washer 730 of the push rod 816 may have a curved portion located further on the outer peripheral side than the slit 732. Accordingly, when the push rod 816 moves downward, the vortex generated on the upper surface of the curved portion is reduced. As a result, the inner washer 730 is prevented from vibrating in the lateral direction due to the vortex generated on the upper surface of the curved portion, so that the tip of the inclined portion 734 of the inner washer 730 is prevented from being worn.

Further, similarly to the push rod 716 in which the main body 716*a* and the protruding portion 716*b* are integrally formed, the push rod 816 may be provided with an inner protruding portion integrally formed with the main body 316*a* at a position located in the first through-hole 393*a*. This makes it possible to make the inner protruding portion less likely to fall off from the main body 316*a* with high accuracy, so that the main body 316*a* and the inner protruding portion can be integrally moved with high accuracy.

The push rod 816 has an inner washer 730 in addition to the washer 700. However, it is not limited to such an embodiment. For example, the push rod 816 may have an inner washer 730 instead of the washer 700. By having the inner washer 730, when the power supply to the coil 321 is stopped in the third switching state, the push rod 816 moves upward more quickly than the configuration without the inner washer 730.

Further, the inner washer 730 is illustrated as having a disk shape, but may have another shape such as a rectangular shape.

Further, the push rod in the invention can be in a form in which the features of the first to fifth modification examples are appropriately combined. For example, a push rod having a main body 416*a* and a washer 710 fitted to the main body 416*a* may be used.

In the above description, a solenoid 320 in which an axial thrust is generated in the plunger 323 such that the protruding amount of the operating rod 324 from the case 325 increases as the current supplied to the coil 321 increases is exemplified. However, the solenoid in the invention is not limited to this form. For example, the axial thrust may be generated in the plunger 323 so that the protruding amount of the operating rod 324 from the case 325 decreases as the current supplied to the coil 321 increases. Even with the flow path switching unit 300 configured as described above, in one unit, three control modes, that is, an ascending mode for increasing the vehicle height, a descending mode for decreasing the vehicle height, and a maintaining mode for maintaining the vehicle height can be controlled according to the current amount.

In the embodiment described above, a configuration in which the flow path switching unit 300 capable of switching between the three control modes, that is, the ascending mode, the descending mode, and the maintaining mode, is applied to the front fork 21 is illustrated. However, there is no particular limitation. The flow path switching unit 300 according to the embodiment described above may be applied to the rear suspension 22.

In the above description, the flow path control device and the vehicle height adjustment device for a motorcycle are described. However, the flow path control device and the vehicle height adjustment device of the invention may be applied to a tricycle having three wheels.

REFERENCE SIGNS LIST

21: front fork (vehicle height adjustment device)
40: reservoir chamber (second chamber)
60: jack chamber (first chamber)
250: spring length changing unit (changing device)
300: flow path switching unit (flow path control device)
301: first on-off valve
302: second on-off valve
303: third on-off valve (control valve)
304: fourth on-off valve (on-off valve)
305: control valve
316, 416, 516, 716, 816: push rod
316*a*, 416*a*, 716*a*: main body (rod-shaped portion)
500: spring
600: pump
700, 710, 720: washer (protruding portion)

716b: protruding portion
730: inner washer (inner protruding portion)
B1: back pressure chamber
R1: first communication path
R2: second communication path
R3: third communication path (detour)
R4: fourth communication path (flow path)

What is claimed is:

1. A flow path control device, comprising:
an on-off valve for opening or closing a flow path through which fluid flows from a first chamber to a second chamber;
a control valve which controls the opening and closing of the on-off valve by transiting between a first state in which the on-off valve is moved to a position where the flow path is closed and a second state in which the on-off valve is moved to a position where the flow path is opened; and
a push rod which includes a rod-shaped portion and a protruding portion, said rod-shaped portion having one end and other end in a longitudinal direction thereof, the other end being configured to cause the control valve to transition from the first state to the second state when the one end is pressed and moved toward the control valve, and said protruding portion protruding radially outward of the rod-shaped portion from an outer peripheral surface of the rod-shaped portion so as to receive pressure of fluid flowing from the first chamber to the second chamber, wherein
a washer fitted on the outer peripheral surface of the rod-shaped portion is the protruding portion.

2. The flow path control device according to claim 1, wherein
a space between the outer peripheral surface of the rod-shaped portion and an inner peripheral surface of a member surrounding an outer periphery of the rod-shaped portion is a part of the flow path, and
the protruding portion is disposed in the space.

3. The flow path control device according to claim 2, wherein
the washer has a through-hole in which the rod-shaped portion is fitted in a central portion and an inclined portion which is continuous with the through-hole and is inclined with respect to an axial direction of the rod-shaped portion and an inner diameter of the inclined portion is reduced as it goes away from the control valve.

4. The flow path control device according to claim 3, wherein
the rod-shaped portion has a groove recessed from the outer peripheral surface, and
the washer is fitted to the outer peripheral surface of the rod-shaped portion at the groove.

5. The flow path control device according to claim 2, wherein
a detour in which fluid bypasses a position which is closed by the on-off valve and flows from the first chamber to the second chamber when the on-off valve closes the flow path is provided inside the on-off valve, and
the push rod has an inner protruding portion which protrudes radially outward of the rod-shaped portion from the outer peripheral surface of the rod-shaped portion inside the on-off valve.

6. The flow path control device according to claim 2, wherein
the protruding portion has a plurality of holes penetrating in the axial direction of the rod-shaped portion.

7. A vehicle height adjustment device, comprising:
a spring with one end supported on a vehicle body side and the other end supported on a wheel side;
a changing device which changes a length of the spring according to an amount of fluid in the first chamber for accommodating fluid; and
the flow path control device according to claim 2.

8. The flow path control device according to claim 1, wherein
a detour in which fluid bypasses a position which is closed by the on-off valve and flows from the first chamber to the second chamber when the on-off valve closes the flow path is provided inside the on-off valve, and
the push rod has an inner protruding portion which protrudes radially outward of the rod-shaped portion from the outer peripheral surface of the rod-shaped portion inside the on-off valve.

9. The flow path control device according to claim 8, wherein
the washer has a through-hole in which the rod-shaped portion is fitted in a central portion and an inclined portion which is continuous with the through-hole and is inclined with respect to an axial direction of the rod-shaped portion and an inner diameter of the inclined portion is reduced as it goes away from the control valve.

10. The flow path control device according to claim 1, wherein
the washer has a through-hole in which the rod-shaped portion is fitted in a central portion and an inclined portion which is continuous with the through-hole and is inclined with respect to an axial direction of the rod-shaped portion and an inner diameter of the inclined portion is reduced as it goes away from the control valve.

11. The flow path control device according to claim 10, wherein
the rod-shaped portion has a groove recessed from the outer peripheral surface, and
the washer is fitted to the outer peripheral surface of the rod-shaped portion at the groove.

12. The flow path control device according to claim 1, wherein
the protruding portion has a plurality of holes penetrating in the axial direction of the rod-shaped portion.

13. A vehicle height adjustment device, comprising:
a spring with one end supported on a vehicle body side and the other end supported on a wheel side;
a changing device which changes a length of the spring according to an amount of fluid in the first chamber for accommodating fluid; and
the flow path control device according to claim 1.

14. A flow path control device, comprising:
an on-off valve for opening or closing a flow path through which fluid flows from a first chamber to a second chamber;
a control valve which controls the opening and closing of the on-off valve by transiting between a first state in which the on-off valve is moved to a position where the flow path is closed and a second state in which the on-off valve is moved to a position where the flow path is opened; and
a push rod which includes a rod-shaped portion and a protruding portion, said rod-shaped portion having one end and other end in a longitudinal direction thereof, the one end being configured to cause the control valve to transition from the first state to the second state when the one end is pressed and moved toward the control valve, and said protruding portion protruding radially outward of the rod-shaped portion from an outer peripheral surface of the rod-shaped portion so as to receive pressure of fluid flowing from the first chamber to the second chamber, wherein the protruding portion has a plurality of holes penetrating in an axial direction of the rod-shaped portion.

15. The flow path control device according to claim 14, wherein
a space between the outer peripheral surface of the rod-shaped portion and an inner peripheral surface of a member surrounding an outer periphery of the rod-shaped portion is a part of the flow path, and
the protruding portion is disposed in the space.

16. The flow path control device according to claim 15, wherein
a detour in which fluid bypasses a position which is closed by the on-off valve and flows from the first chamber to the second chamber when the on-off valve closes the flow path is provided inside the on-off valve, and
the push rod has an inner protruding portion which protrudes radially outward of the rod-shaped portion from the outer peripheral surface of the rod-shaped portion inside the on-off valve.

17. The flow path control device according to claim 15, wherein
the protruding portion is joined to the rod-shaped portion.

18. The flow path control device according to claim 14, wherein
a detour in which fluid bypasses a position which is closed by the on-off valve and flows from the first chamber to the second chamber when the on-off valve closes the flow path is provided inside the on-off valve, and
the push rod has an inner protruding portion which protrudes radially outward of the rod-shaped portion from the outer peripheral surface of the rod-shaped portion inside the on-off valve.

19. The flow path control device according to claim 14, wherein
the protruding portion is joined to the rod-shaped portion.

20. A vehicle height adjustment device, comprising:
a spring with one end supported on a vehicle body side and the other end supported on a wheel side;
a changing device which changes a length of the spring according to an amount of fluid in the first chamber for accommodating fluid; and
the flow path control device according to claim 14.

* * * * *